(12) United States Patent
Ohshita et al.

(10) Patent No.: US 11,063,503 B2
(45) Date of Patent: Jul. 13, 2021

(54) BRUSHLESS MOTOR

(71) Applicant: DENSO CORPORATION, Kariya (JP)

(72) Inventors: Takehiko Ohshita, Kosai (JP); Yoshimichi Sahara, Kosai (JP)

(73) Assignee: DENSO CORPORATION, Kariya (JP)

( * ) Notice: Subject to any disclaimer, the term of this patent is extended or adjusted under 35 U.S.C. 154(b) by 433 days.

(21) Appl. No.: 16/072,182

(22) PCT Filed: Feb. 3, 2017

(86) PCT No.: PCT/JP2017/004133
§ 371 (c)(1),
(2) Date: Jul. 24, 2018

(87) PCT Pub. No.: WO2017/138466
PCT Pub. Date: Aug. 17, 2017

(65) Prior Publication Data
US 2019/0036434 A1  Jan. 31, 2019

(30) Foreign Application Priority Data
Feb. 10, 2016  (JP) .............................. JP2016-024111

(51) Int. Cl.
*H02K 29/08* (2006.01)
*H02K 5/10* (2006.01)
(Continued)

(52) U.S. Cl.
CPC ............... *H02K 29/08* (2013.01); *H02K 1/14* (2013.01); *H02K 1/2706* (2013.01);
(Continued)

(58) Field of Classification Search
CPC ........ H02K 29/08; H02K 5/10; H02K 11/215; H02K 11/33; H02K 1/14; H02K 1/2706; H02K 1/2786; H02K 5/225; H02K 5/1737
See application file for complete search history.

(56) References Cited

U.S. PATENT DOCUMENTS 6,002,234 A * 12/1999 Ohm .......................... H02P 6/15
318/438
2004/0072646 A1* 4/2004 Hori ........................ F16H 61/32
475/149
(Continued)

FOREIGN PATENT DOCUMENTS

JP  2010-098887 A  4/2010
JP  2013-158069 A  8/2013
(Continued)

OTHER PUBLICATIONS

English language translation of the following: Office action dated Sep. 1, 2020 from the JPO in a Japanese patent application No. 2017-018691 corresponding to the instant patent application. This office action translation is submitted now in order to supplement the understanding of the cited references which are being disclosed in the instant Information Disclosure Statement.

*Primary Examiner* — Tulsidas C Patel
*Assistant Examiner* — Riley O Stout
(74) *Attorney, Agent, or Firm* — Solaris Intellectual Property Group, PLLC

(57) ABSTRACT

A brushless motor capable of accurately detecting magnetism and securing rigidity of a center piece is provided. A brushless motor (10) includes; a stator (12); a rotor (14) having a rotor magnet (22) arranged radially outward of the stator (12); a metal center piece (18) that has a plate-like portion (38) disposed opposing the stator (12) at one side in an axial direction of the stator (12), and holds the stator (12);

(Continued)

a control board (42) disposed at an opposite side from the stator (12) with respect to the plate-like portion (38), and provided with a magnetic detection sensor (46); a magnetic induction member (68) extending from a side of the rotor magnet (22) to a side of the magnetic detection sensor (46); and a resin-made connector member (44) that holds a connector terminal (62) connected to the control board (42), holds the magnetic induction member (68), and is fixed to the center piece (18).

8 Claims, 28 Drawing Sheets

(51) Int. Cl.
*H02K 11/215* (2016.01)
*H02K 11/33* (2016.01)
*H02K 1/14* (2006.01)
*H02K 1/27* (2006.01)
*H02K 5/22* (2006.01)
*H02K 5/173* (2006.01)

(52) U.S. Cl.
CPC ............ *H02K 1/2786* (2013.01); *H02K 5/10* (2013.01); *H02K 11/215* (2016.01); *H02K 11/33* (2016.01); *H02K 5/1737* (2013.01); *H02K 5/225* (2013.01)

(56) References Cited

U.S. PATENT DOCUMENTS

| | | | | |
|---|---|---|---|---|
| 2010/0019704 | A1* | 1/2010 | Ueda | H02P 6/12 |
| | | | | 318/400.3 |
| 2013/0193787 | A1* | 8/2013 | Sahara | H02K 29/08 |
| | | | | 310/64 |
| 2014/0009023 | A1* | 1/2014 | Yamamura | H02K 1/2706 |
| | | | | 310/156.01 |

FOREIGN PATENT DOCUMENTS

| | | | | |
|---|---|---|---|---|
| JP | 2015-144564 A | | 8/2015 | |
| WO | WO-2010124534 A1 * | | 11/2010 | H02K 29/03 |

* cited by examiner

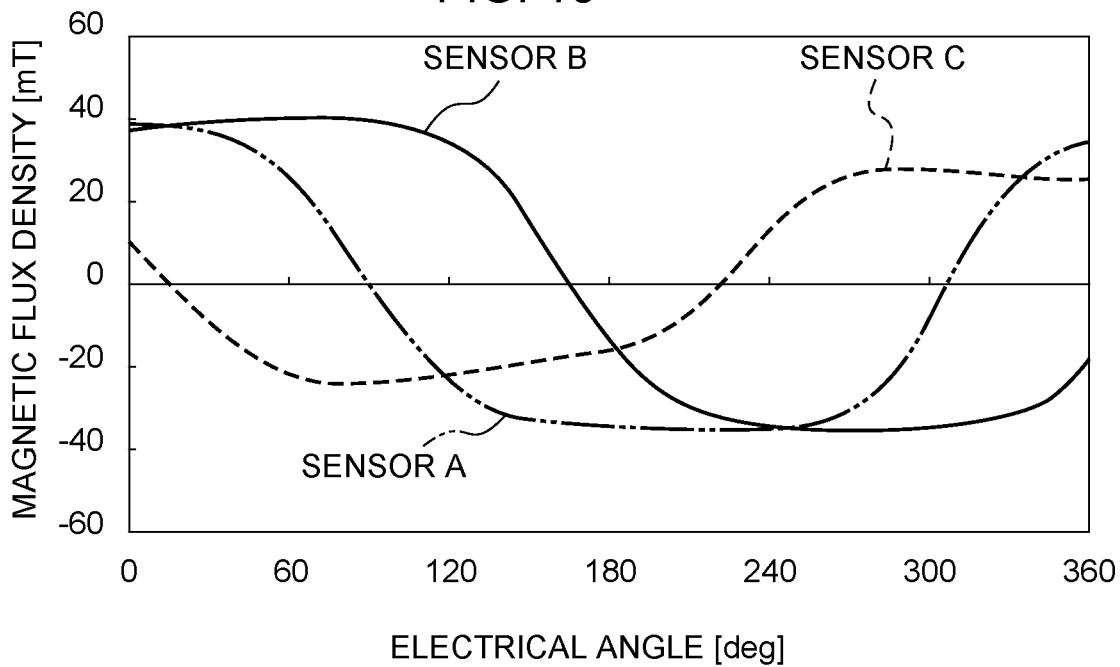
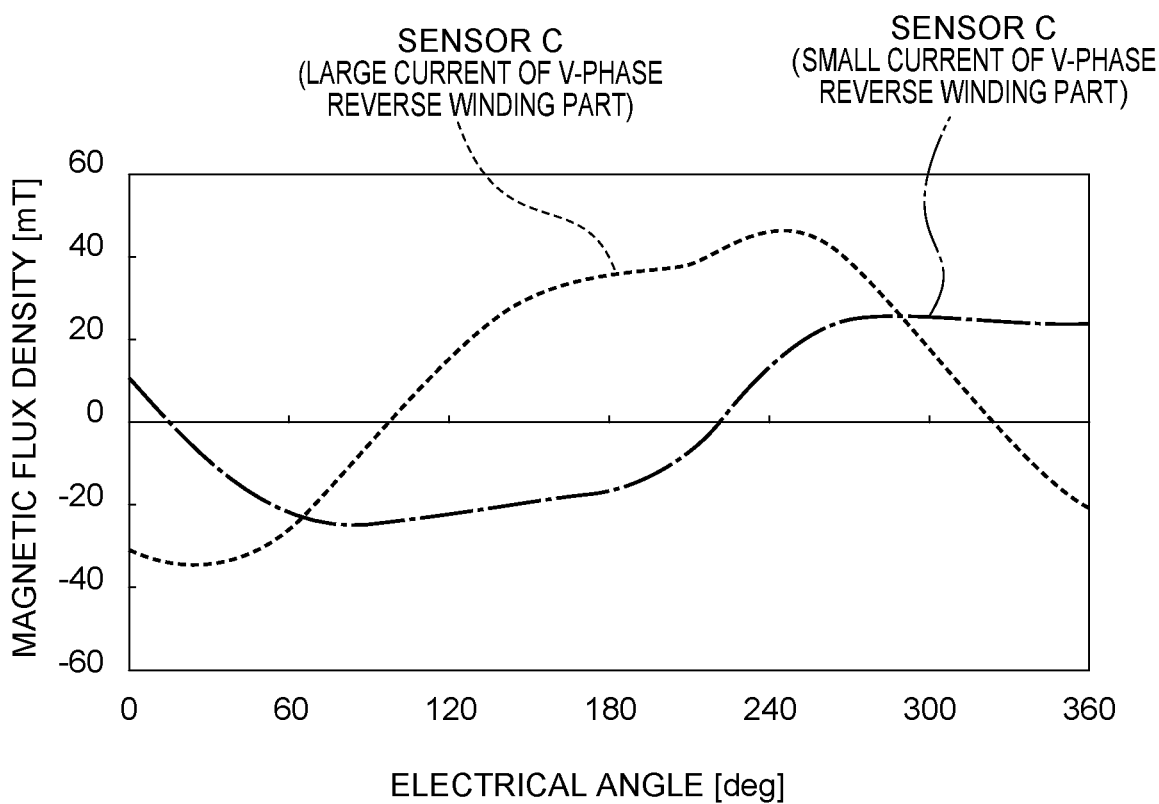

BRUSHLESS MOTOR

TECHNICAL FIELD

The present invention relates to a brushless motor.

BACKGROUND ART

Conventionally, there is a brushless motor including: a stator to form a rotating magnetic field; a rotor having a rotor magnet disposed opposing the stator at a radially outer side of the stator; a center piece that holds the stator; a control board to control the stator; and a magnetic induction member to induce magnetism generated from the rotor magnet to a magnetic detection sensor provided on the control board (e.g., see Patent Literature 1).

In this brushless motor, the center piece has a plate-like portion disposed opposing the stator at one side in an axial direction of the stator, and the control board is disposed at an opposite side from the stator with respect to the plate-like portion. The magnetic induction member passes through the plate-like portion of the center piece, and extends from a side of the rotor magnet to a side of the control board.

CITATION LIST

Patent Literature

Patent Literature 1: Japanese Patent Application Laid-Open (JP-A) No. 2013-158069

SUMMARY OF INVENTION

Technical Problem

In the brushless motor, it is conceivable that the center piece is made of resin in order to accurately detect magnetism, but in a case where the center piece is made of resin, rigidity of the center piece may decrease.

The present invention has been made in view of the above problems, and it is an object of the invention to provide a brushless motor capable of accurately detecting magnetism and securing rigidity of a center piece.

Solution to Problem

In order to solve the above-mentioned problem, a brushless motor according to one aspect of the invention includes: a stator having a plurality of teeth extending radially and a plurality of wire-wound parts wound around the respective plurality of teeth; a rotor having a rotor magnet disposed opposing the stator at a radially outer side of the stator; a center piece that has a plate-like portion opposing the stator at one side in an axial direction of the stator, and that holds the stator; a control board disposed at an opposite side from the stator with respect to the plate-like portion, and provided with a plurality of magnetic detection sensors; a first magnetic induction member, a second magnetic induction member, and a third magnetic induction member that extend from a side of the rotor magnet to a side of the respective magnetic detection sensors, and that induce magnetism generated from the rotor magnet to the respective magnetic detection sensors; and a resin-made connector member that holds a connector terminal that is connected to the control board, and holds the first magnetic induction member, the second magnetic induction member, and the third magnetic induction member, and that is fixed to the center piece, wherein: a relationship between a number of a plurality of magnetic poles formed in the rotor magnet and a number of a plurality of slots formed between the plurality of teeth is 10 poles and 12 slots or 14 poles and 12 slots, the first magnetic induction member is disposed at a line bisecting an opening angle of a first slot among the plurality of slots, the second magnetic induction member is disposed at a line bisecting an opening angle of a second slot that is positioned two slots from the first slot, among the plurality of slots, and the third magnetic induction member is arranged so as to be shifted toward a side of the second magnetic induction member, relative to the first magnetic induction member, by an amount corresponding to 120 degrees in an electrical angle of the rotor.

According to this brushless motor, the resin-made connector member is fixed to the center piece, and the connector member holds the first magnetic induction member, the second magnetic induction member, and the third magnetic induction member. Therefore, since a resin portion of the connector member can be interposed between the metal center piece, and the first magnetic induction member, the second magnetic induction member, and the third magnetic induction member, magnetic leakage does not occur between the center piece, and the first magnetic induction member, the second magnetic induction member, and the third magnetic induction member, whereby magnetism can be accurately detected.

In addition, since the center piece is made of metal, rigidity of the center piece can be secured as compared with a case where the center piece is made of resin.

BRIEF DESCRIPTION OF DRAWINGS

FIG. 10 is a graph showing a relationship between an electrical angle of a rotor in FIG. 1 and a magnetic flux density in "sensor A", "sensor B", and "sensor C".

FIG. 11 is a graph showing a relationship between an electrical angle of the rotor and a magnetic flux density in "sensor C" in cases where a current of the wire-wound part of FIG. 1 is large and small.

DESCRIPTION OF EMBODIMENTS

Hereinafter, a brushless motor according to one embodiment of the present invention will be described with reference to the drawings.

<Mechanical Structure of Brushless Motor>

Figure 1:
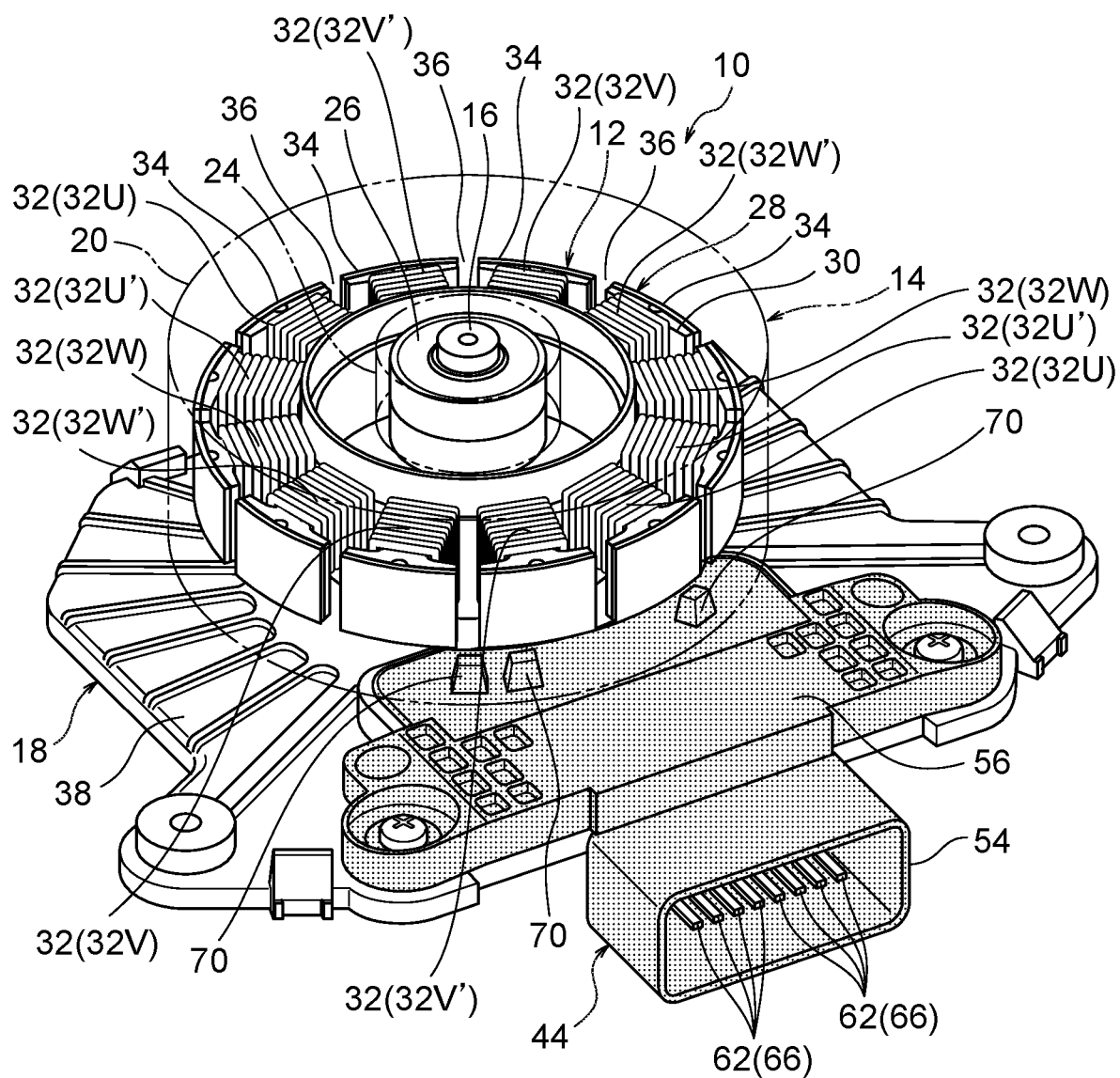
FIG. 1 is a perspective view of a brushless motor according to one embodiment of the present invention.

As shown in FIG. 1, a brushless motor 10 according to one embodiment of the invention includes a stator 12, a rotor 14, a shaft 16, and a center piece 18. In FIG. 1, for ease of understanding of a structure of the stator 12 and the like, the rotor 14 is indicated by an imaginary line.

The stator 12 is formed in an annular shape as a whole, and is arranged coaxially with the shaft 16. This stator 12 has a stator core 28, an insulator 30, and a plurality of wire-wound parts 32. The stator core 28 is formed with a plurality of teeth 34 radially extending around the shaft 16, and a slot 36 having a substantially V shape is formed between these plurality of teeth 34. The plurality of wire-wound parts 32 are formed by winding a winding wire around each of the plurality of teeth 34 via the insulator 30.

Figure 2:
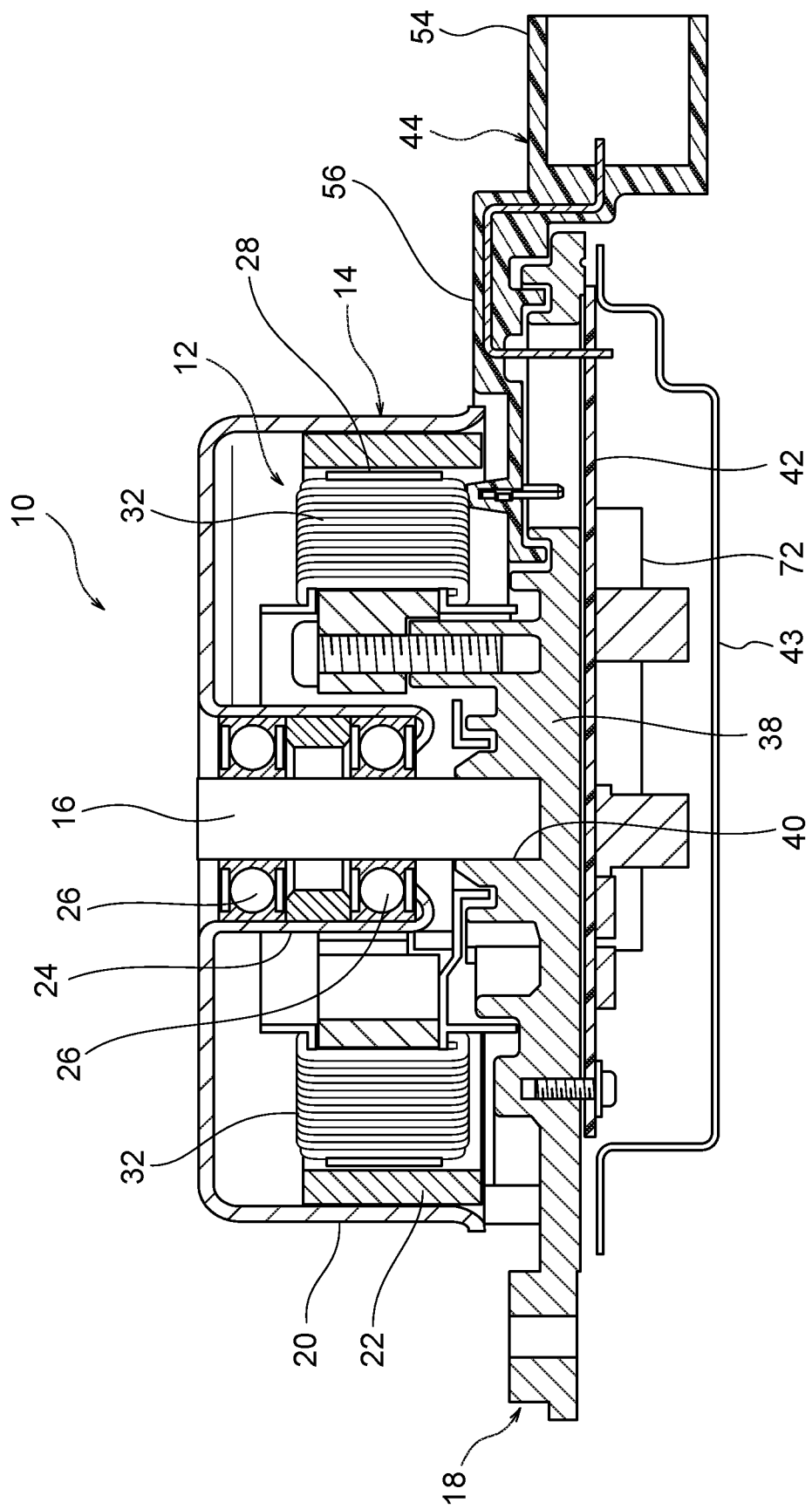
FIG. 2 is a longitudinal sectional view of the brushless motor of FIG. 1.

As shown in FIG. 2, the rotor 14 has a rotor housing 20 and a rotor magnet 22. The rotor housing 20 is formed in a topped cylindrical shape, and a cylindrical bearing housing 24 is formed at a center portion of a top wall portion of the rotor housing 20. The bearing housing 24 accommodates a pair of bearings 26, and the rotor 14 is rotatably supported by the shaft 16 via the pair of bearings 26.

The rotor magnet 22 is fixed to an inner peripheral surface of the rotor housing 20. This rotor housing 20 is annularly provided along a circumferential direction of the rotor 14, and is configured to have N poles and S poles alternately in the circumferential direction of the rotor 14. The brushless motor 10 is of a so-called outer rotor type, and the rotor magnet 22 is disposed opposing the stator 12 at a radially outer side of the stator 12.

The center piece 18 is made of a metal such as iron or aluminum, and has a plate-like portion 38 and a shaft support part 40. The plate-like portion 38 is disposed opposing the stator 12 at one side in an axial direction of the stator 12. The stator 12 is held on the plate-like portion 38 by screwing or the like.

The shaft support part 40 is formed at a center portion of the plate-like portion 38, and is formed in a recessed shape that opens toward the stator 12 side. The shaft 16 is insert-molded in the shaft support part 40. Note that one end of the shaft 16 may be fixed by being press-fitted to the shaft support part 40. The shaft 16 is disposed inside the annularly formed stator 12, and extends from the plate-like portion 38 along the axial direction of the stator 12.

As shown in FIG. 2, the brushless motor 10 according to one embodiment of the invention includes a control board 42, a circuit case 43, and a connector member 44 in addition to each of the above-described components.

The control board 42 is for control of the stator 12, and is disposed at an opposite side from the stator 12 with respect to the plate-like portion 38. This control board 42 is provided along the plate-like portion 38. The circuit case 43 is fixed to the plate-like portion 38 from an opposite side from the stator 12, and the control board 42 is accommodated in a space between the plate-like portion 38 and the circuit case 43.

Figure 3:
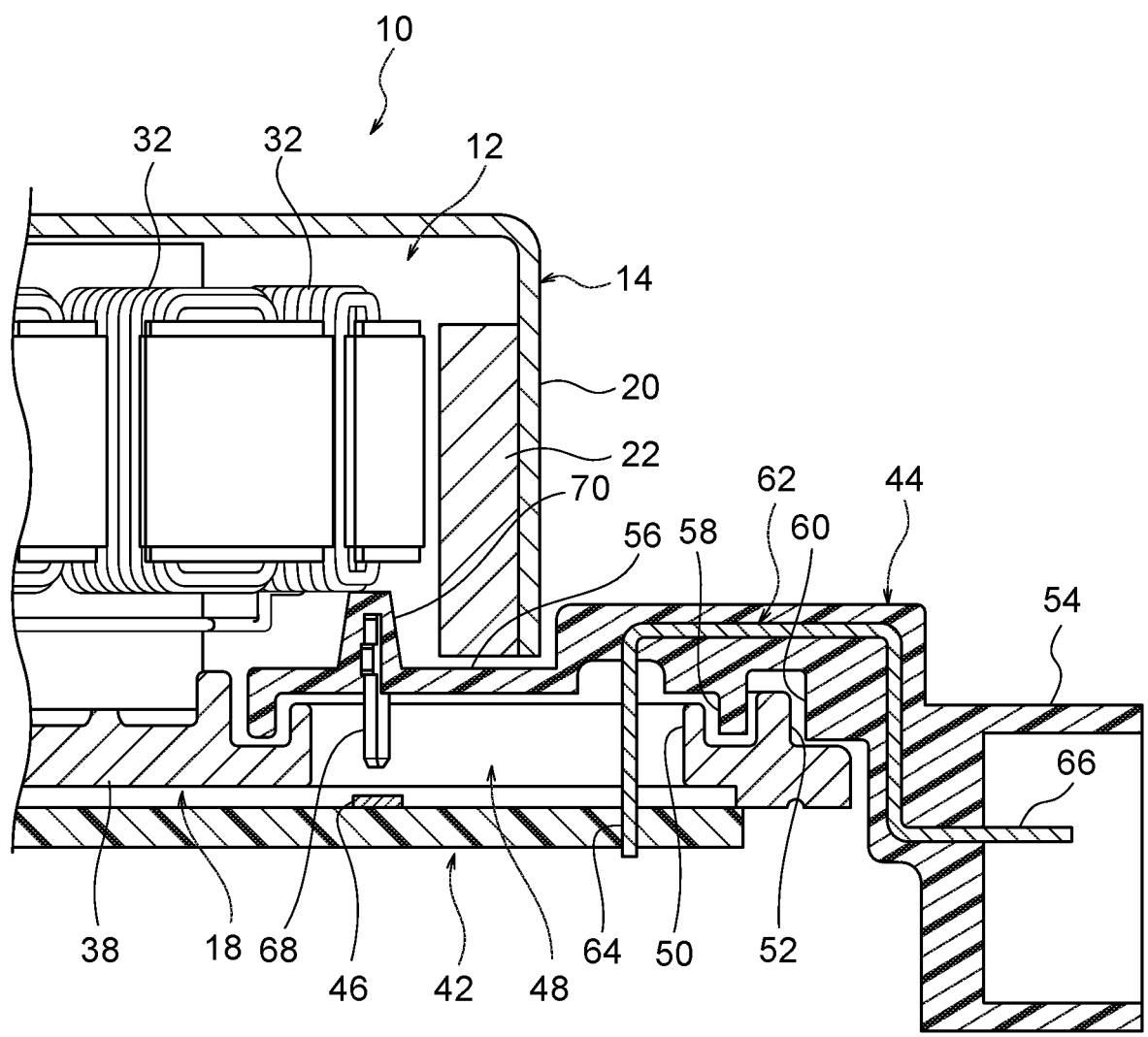
FIG. 3 is a vertical cross-sectional view of a peripheral portion of a connector member in the brushless motor of FIG. 1.

As shown in FIG. 3, on the plate-like portion 38 side, a magnetic detection sensor 46 is provided on a surface of the control board 42. In FIG. 3, only one magnetic detection sensor 46 is shown, but a plurality of the magnetic detection sensors 46 are provided on the control board 42.

Figure 4:
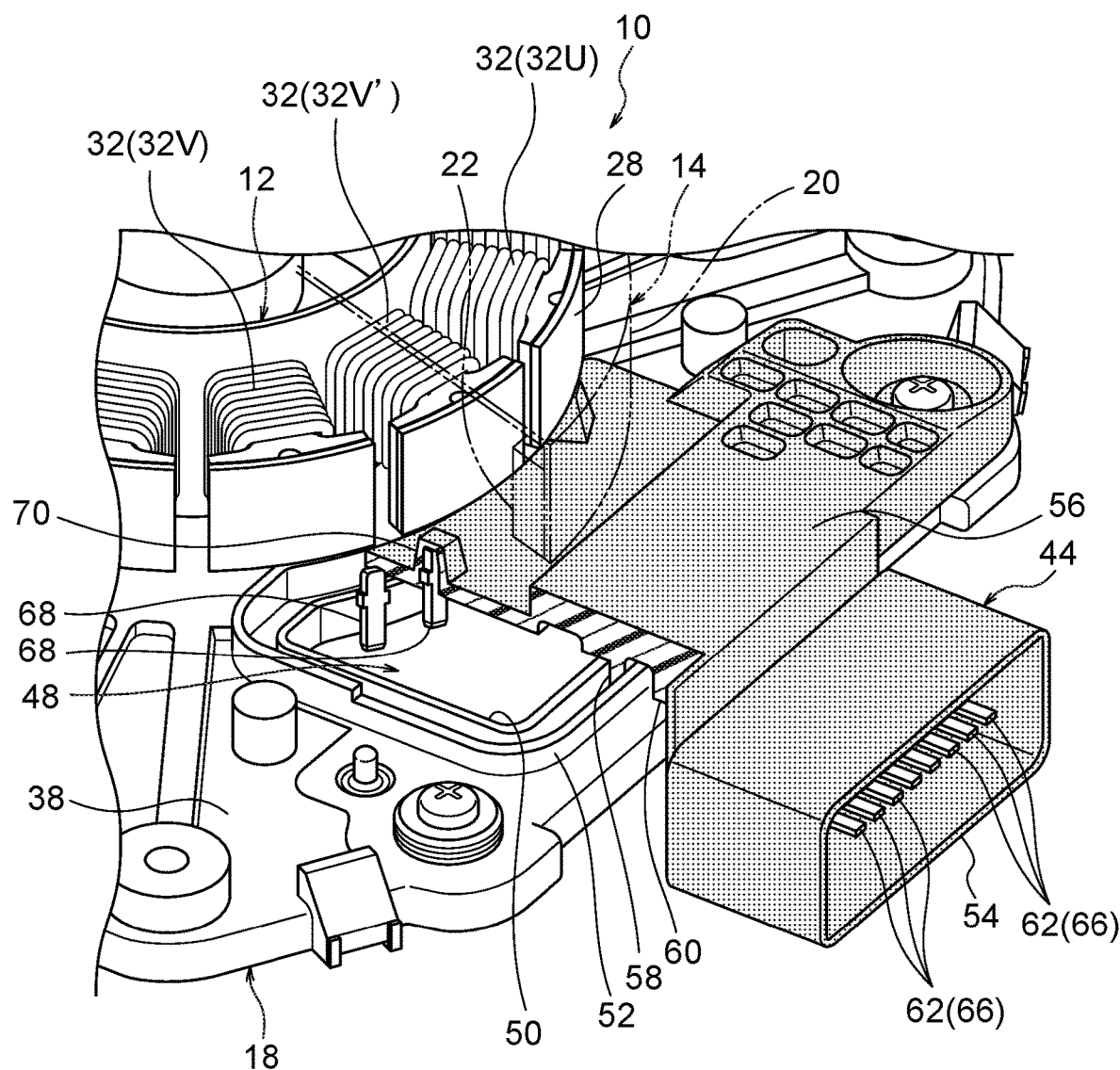
FIG. 4 is a perspective view of a peripheral portion of the connector member in the brushless motor of FIG. 1.

As shown in FIGS. 3 and 4, in a part of the plate-like portion 38 (a portion corresponding to the above-described magnetic detection sensor 46), there is formed an opening 48 to pass a magnetic induction member 68 and a connector terminal 62, which will be described later. In FIG. 4, for ease of understanding of a structure of the connector member 44 and the like, the rotor 14 is indicated by an imaginary line.

The opening 48 is formed in a hole shape penetrating in a thickness direction of the plate-like portion 38. On a peripheral portion of the opening 48, double wall portions 50 and 52 are formed protruding toward a front side of the plate-like portion 38, that is, toward the stator 12 side with respect to the plate-like portion 38. These double wall portions 50 and 52 are formed over the entire periphery of the opening 48.

The connector member 44 is made of resin and is fixed to the plate-like portion 38 by screwing or the like. This connector member 44 integrally has a connector housing part 54 and a lid part 56. The connector housing part 54 protrudes toward a side of the plate-like portion 38 and opens toward the side of the plate-like portion 38.

The lid part 56 is formed to be slightly larger than the above-described opening 48. In a state in which the connector member 44 is fixed to the plate-like portion 38, the lid part 56 closes the opening 48 from the stator 12 side. On a peripheral portion of the lid part 56, double wall portions 58 and 60 are formed protruding toward a back side of the plate-like portion 38, that is, toward an opposite side from the stator 12 with respect to the plate-like portion 38. These double wall portions 58 and 60 are formed over the entire periphery of the lid part 56. These double wall portions 58 and 60 are alternately assembled to the double wall portions 50 and 52 formed on the peripheral portion of the above-described opening 48.

That is, an inner wall portion 58 of the double wall portions 58 and 60 is inserted between the double wall portions 50 and 52, while an outer wall portion 60 of the double wall portions 58 and 60 externally surrounds an outer wall portion 52 of the double wall portions 50 and 52. Between the double wall portions 50 and 52 and the double wall portions 58 and 60, an adhesive, a sealing agent, or the like, is applied, thereby providing sealing between the peripheral portion of the opening 48 and the lid part 56.

As shown in FIG. 3, the connector member 44 is integrally provided with the connector terminal 62 (terminal) by molding. One end 64 of this connector terminal 62 extends toward the control board 42 side through the opening 48 (see also FIG. 6) and is connected to the control board 42. Whereas, the other end 66 of the connector terminal 62 is an external connecting part to be connected to the outside, and is disposed inside the connector housing part 54.

Figure 5:
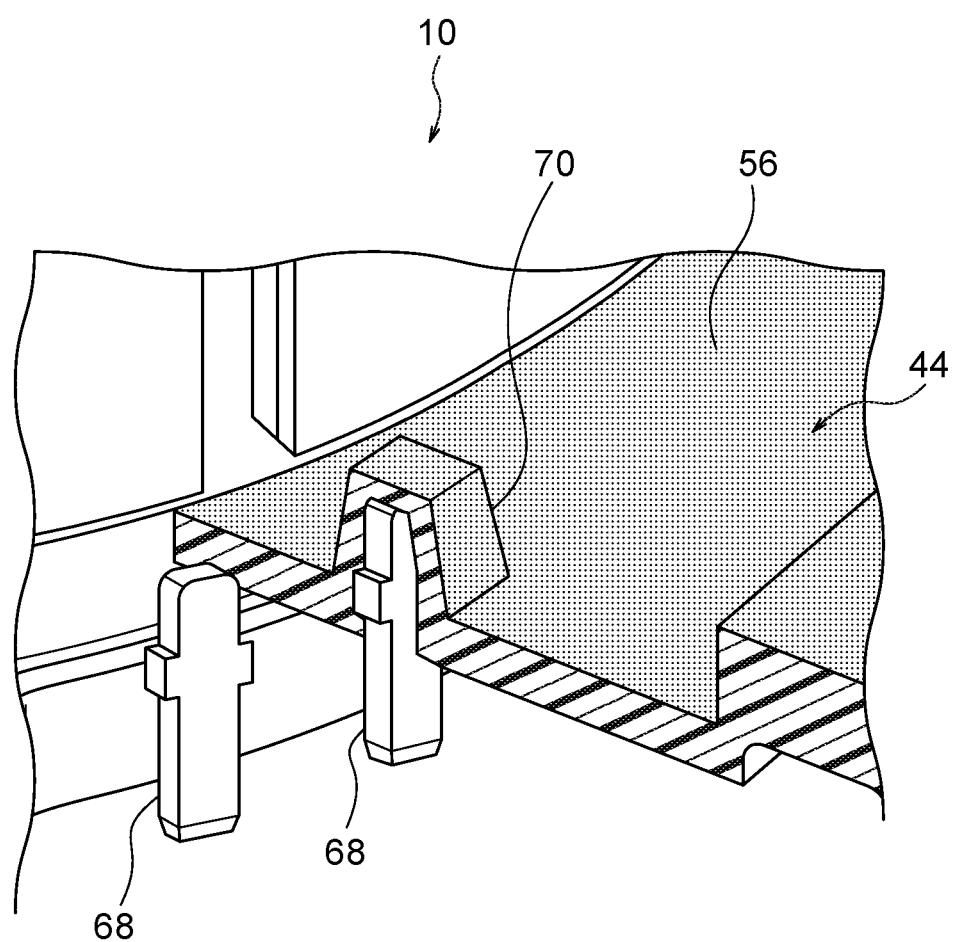
FIG. 5 is a perspective view of a peripheral portion of a magnetic induction member in the brushless motor of FIG. 1.

As shown in FIGS. 3 and 4, the brushless motor 10 according to one embodiment of the invention includes a plurality of the magnetic induction members 68. The plurality of magnetic induction members 68 are formed in a linear shape extending along the thickness direction of the plate-like portion 38 (see also FIG. 5). As shown in FIG. 3, the plurality of magnetic induction members 68 extend from a side of the rotor magnet 22 (stator 12) to a side of the magnetic detection sensor 46 through the opening 48, and have a function to induce magnetism generated from the rotor magnet 22 to the magnetic detection sensor 46. Each magnetic detection sensor 46 is located on an extension line of each magnetic induction member 68 formed linearly.

At positions corresponding to the plurality of magnetic induction members 68 in the lid part 56, a plurality of holding parts 70 are formed. These plurality of holding parts 70 protrude to the stator 12 side with respect to a surrounding part of the plurality of holding parts 70 in the lid part 56. An inside of the plurality of holding parts 70 is formed in a recessed shape that opens on the back side of the plate-like portion 38, that is, opens on the control board 42 side with respect to the plate-like portion 38. The plurality of magnetic induction members 68 are held by the lid part 56, in a state of being fitted inside the plurality of holding parts 70 (see also FIG. 5).

These plurality of magnetic induction members 68 may be held by the plurality of holding parts 70 together with formation of the plurality of holding parts 70 when molded with the resin-made connector member 44, or may be fitted inside the plurality of holding parts 70 after the connector member 44 is resin-molded separately from the plurality of magnetic induction members 68, and the plurality of holding parts 70 are formed.

The lid part 56 is disposed at an opposite side from the magnetic detection sensor 46 with respect to the magnetic induction member 68, and each magnetic induction member 68 is covered with the lid part 56 from the opposite side from the magnetic detection sensor 46.

Figure 29:
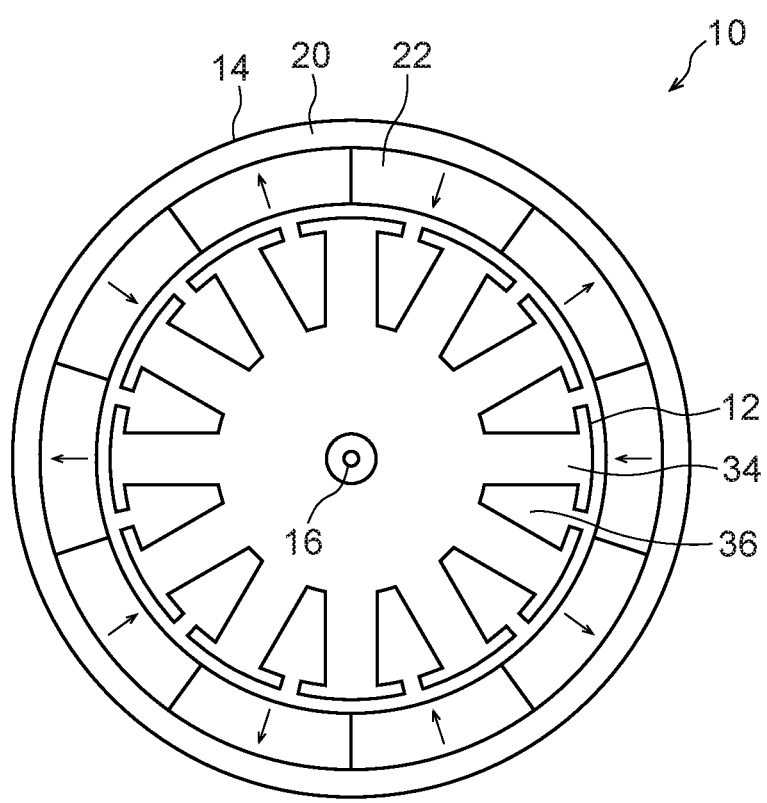
FIG. 29 shows a stator, rotor, and rotor magnets whereby there are 10 magnetic poles and 12 slots.
Figure 30:
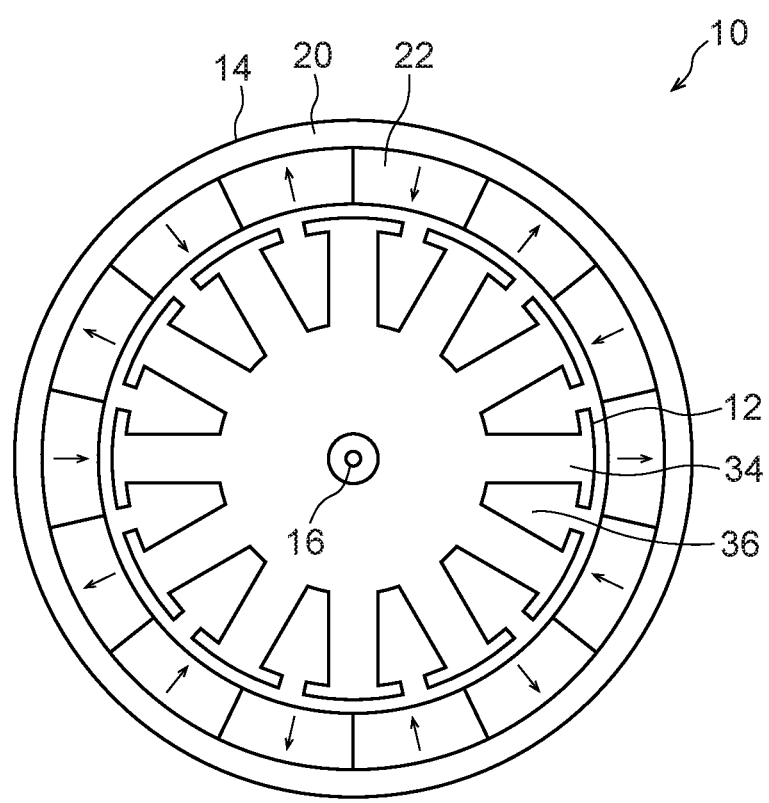
FIG. 30 shows a stator, rotor, and rotor magnets whereby there are 14 magnetic poles and 12 slots.

In the brushless motor 10 of the present embodiment having the above configuration, a relationship between the number of a plurality of magnetic poles formed in the rotor magnet 22 and the number of a plurality of the slots 36 formed in the stator 12 is set to 10 poles and 12 slots (FIG. 29) or 14 poles and 12 slots (FIG. 30).

Figure 8:
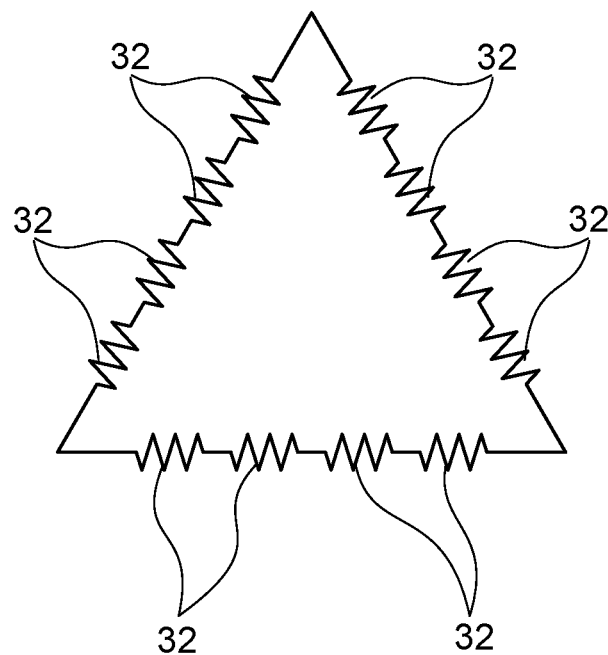
FIG. 8 is a connection diagram in a case where a plurality of wire-wound parts of FIG. 1 are connected in three-phase series delta connection.
Figure 9:
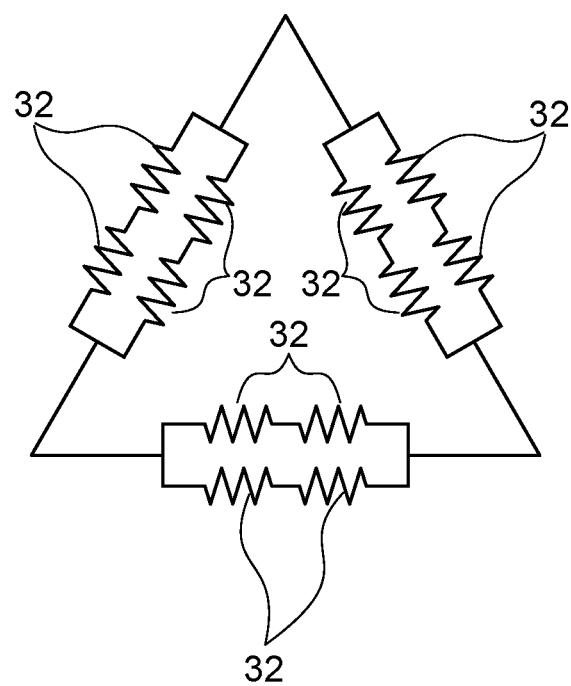
FIG. 9 is a connection diagram in a case where the plurality of wire-wound parts of FIG. 1 are connected in three-phase parallel delta connection.

The number of the plurality of wire-wound parts 32 is twelve, and these twelve wire-wound parts 32 are delta-connected. As a method of the delta connection, three-phase series delta connection shown in FIG. 8, or three-phase parallel delta connection shown in FIG. 9 are applied.

The plurality of wire-wound parts 32 include two kinds of wire-wound parts, which are a normal winding part with a winding wire wound in a normal winding direction, and a reverse winding part with a winding wire wound in a reverse winding direction opposite to the normal winding direction. The plurality of wire-wound parts 32 form three-phases of a U-phase, a V-phase, and a W-phase. Hereinafter, in a case of identifying the normal winding part and the reverse winding part of each phase of the U-phase, the V-phase, and the W-phase, the normal winding part and the reverse winding part of each phase of the U-phase, V-phase, W-phase are referred to as a U-phase normal winding part 32U, a U-phase reverse winding part 32U', a V-phase normal winding part 32V, a V-phase reverse winding part 32V', a W-phase normal winding part 32W, and a W-phase reverse winding part 32W'.

As shown in FIG. 1, the twelve wire-wound parts 32 are aligned in a circumferential direction of the stator 12 in an order of: the U-phase normal winding part 32U, the U-phase reverse winding part 32U', the W-phase normal winding part 32W, the W-phase reverse winding part 32W', the V-phase normal winding part 32V, the V-phase reverse winding part 32V', the U-phase normal winding part 32U, the U-phase reverse winding part 32U', the W-phase normal winding part 32W, the W-phase reverse winding part 32W', the V-phase normal winding part 32V, and the V-phase reverse winding part 32V'.

In the above-described configuration of 10 poles and 12 slots or 14 poles and 12 slots, the number of the plurality of magnetic induction members 68 shown in FIGS. 3 and 4 is three. An arrangement of these three magnetic induction members 68 is devised, which is specifically as follows. Hereinafter, in a case of identifying the plurality of magnetic induction members 68, the plurality of magnetic induction members 68 are referred to as a first magnetic induction member 68A, a second magnetic induction member 68B, and a third magnetic induction member 68C.

Figure 7:
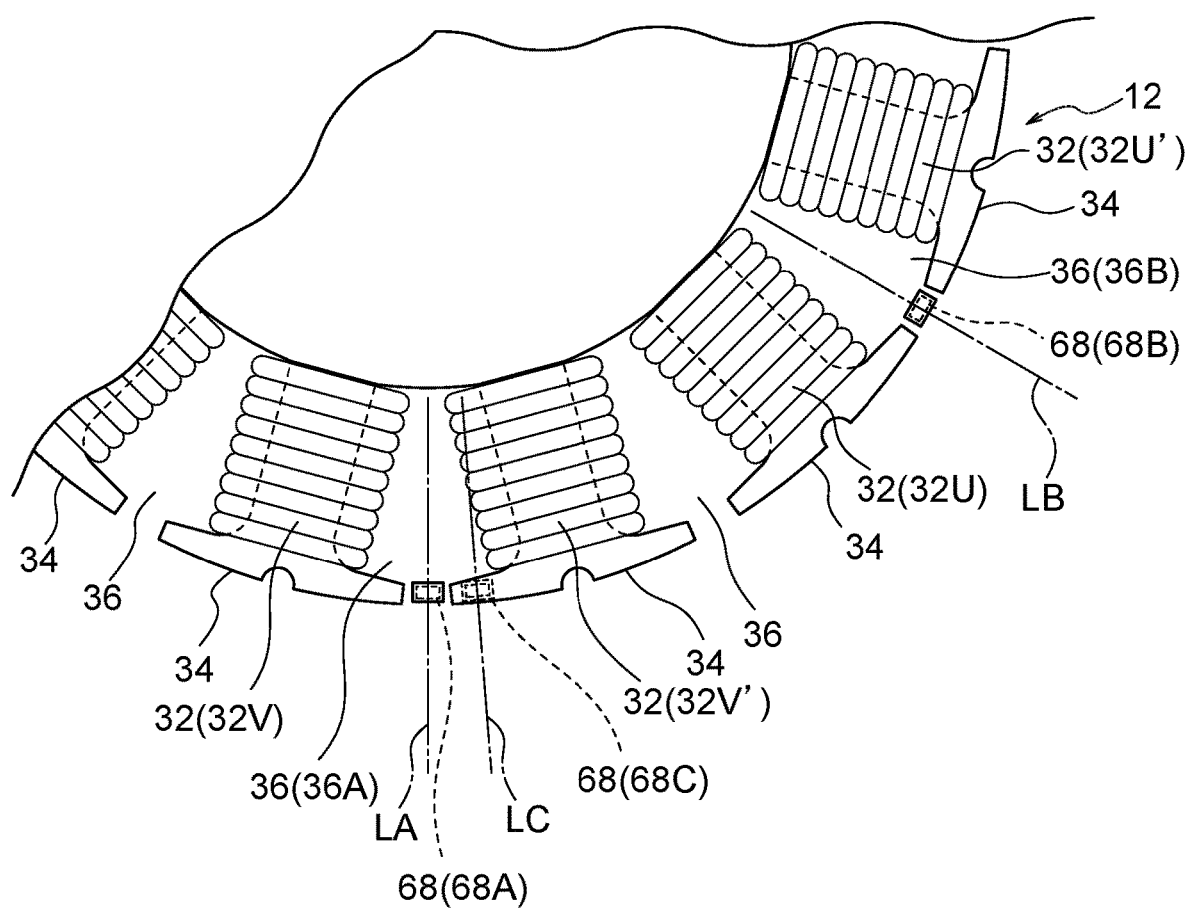
FIG. 7 is a plan view showing a positional relationship between a slot of a stator of FIG. 1, and each of a first magnetic induction member, a second magnetic induction member, and a third magnetic induction member of FIG. 6.

As shown in FIG. 7, the first magnetic induction member 68A is disposed at a line LA bisecting an opening angle of a first slot 36A among the plurality of slots 36, and the second magnetic induction member 68B is disposed at a line LB bisecting an opening angle of a second slot 36B that is positioned two slots 36 from the first slot 36A, among the plurality of slots 36. The third magnetic induction member 68C is arranged displaced toward the second magnetic induction member 68B side with respect to the first magnetic induction member 68A, by an amount corresponding to 120 degrees in electrical angle of the rotor 14 with which a three-phase motor can drive.

The above-described line LA corresponds to a line connecting a center of the stator 12 and a center of the first magnetic induction member 68A, and the above-described line LB corresponds to a line connecting the center of the stator 12 and a center of the second magnetic induction member 68B. In the present embodiment, an angle formed by the line LA and the line LB is 60 degrees of mechanical angle. A line LC shown in FIG. 7 corresponds to a line connecting the center of the stator 12 and a center of the third magnetic induction member 68C. In the present embodiment, an angle formed by the line LA and the line LC is 12 degrees of mechanical angle.

The first slot 36A and second slot 36B each corresponding to the first magnetic induction member 68A and the second magnetic induction member 68B described above are, more specifically, among the plurality of slots 36, each configured as slots between a pair of teeth 34 that are adjacent to each other in the circumferential direction of the stator 12, and respectively formed with the normal winding part and the reverse winding part of a same phase.

As an example, the first slot 36A corresponding to the first magnetic induction member 68A is configured as a slot between a pair of teeth 34 that are adjacent to each other in the circumferential direction of the stator 12 and respectively formed with the V-phase normal winding part 32V and the V-phase reverse winding part 32V'. The second slot 36B corresponding to the second magnetic induction member 68B is configured as a slot between a pair of teeth 34 that are adjacent to each other in the circumferential direction of the stator 12 and respectively formed with the U-phase normal winding part 32U and the U-phase reverse winding part 32U', among the plurality of teeth 34. The third magnetic induction member 68C is arranged corresponding to the V-phase reverse winding part 32V'.

As shown in FIG. 2, the control board 42 is provided with a control unit 72. The control unit 72 is, for example, a microcomputer having a CPU, a ROM, a RAM, and the like, and the control unit 72 controls a control element provided on the control board 42, and switches a timing of energizing each wire-wound part 32. When this control unit 72 controls the control element and switches the timing of energizing each wire-wound part 32, the stator 12 forms a rotating magnetic field, an attractive repulsive force acts between the stator 12 and the rotor magnet 22, and the rotor 14 is rotated.

When the rotation of the rotor 14 causes a magnetic pole of the rotor magnet 22 shown in FIG. 3 to pass near the plurality of magnetic induction members 68, magnetism from the magnetic pole is induced by the plurality of magnetic induction members 68 to the magnetic detection sensor 46, and detected by the magnetic detection sensor 46. Then, a rotational speed of the rotor 14 is adjusted by switching a timing of energizing each wire-wound part 32 by the control unit 72, based on an output signal from the magnetic detection sensor 46.

<Characteristics of Brushless Motor>

The following describes characteristics of the brushless motor 10 in which the first magnetic induction member 68A, the second magnetic induction member 68B, and the third magnetic induction member 68C are arranged in the above characteristic arrangement.

Hereinafter, "sensor A" corresponds to a combination of the first magnetic induction member 68A and the magnetic detection sensor 46 corresponding to the first magnetic induction member 68A, "sensor B" corresponds to a combination of the second magnetic induction member 68B and the magnetic detection sensor 46 corresponding to the second magnetic induction member 68B, and "sensor C" corresponds to a combination of the third magnetic induction member 68C and the magnetic detection sensor 46 corresponding to the third magnetic induction member 68C.

FIG. 10 is a graph showing a relationship between an electrical angle of the rotor 14 and a magnetic flux density in "sensor A", "sensor B", and "sensor C". As shown in FIG. 10, since "sensor A" and "sensor B" are at positions corresponding to the slots 36 not influenced by a current of the wire-wound part 32, no noise occurs in a waveform of the magnetic flux density. Whereas, since "sensor C" is at a position corresponding to the wire-wound part 32 (V-phase reverse winding part 32V'), noise may occur in a waveform of the magnetic flux density due to influence of a current of the wire-wound part 32. FIG. 10 shows a state in which "sensor C" is not influenced by the current.

FIG. 11 is a graph showing a relationship between an electrical angle of the rotor 14, and a magnetic flux density in "sensor C" in cases where a current of the wire-wound part 32 is large and small. As shown in FIG. 11, in a case where the current of the wire-wound part 32 is large, influence of the current becomes larger than a case where the current of the wire-wound part 32 is small, which causes noise in the waveform of the magnetic flux density in "sensor C", and changes the waveform as indicated in FIG. 11.

Figure 12:
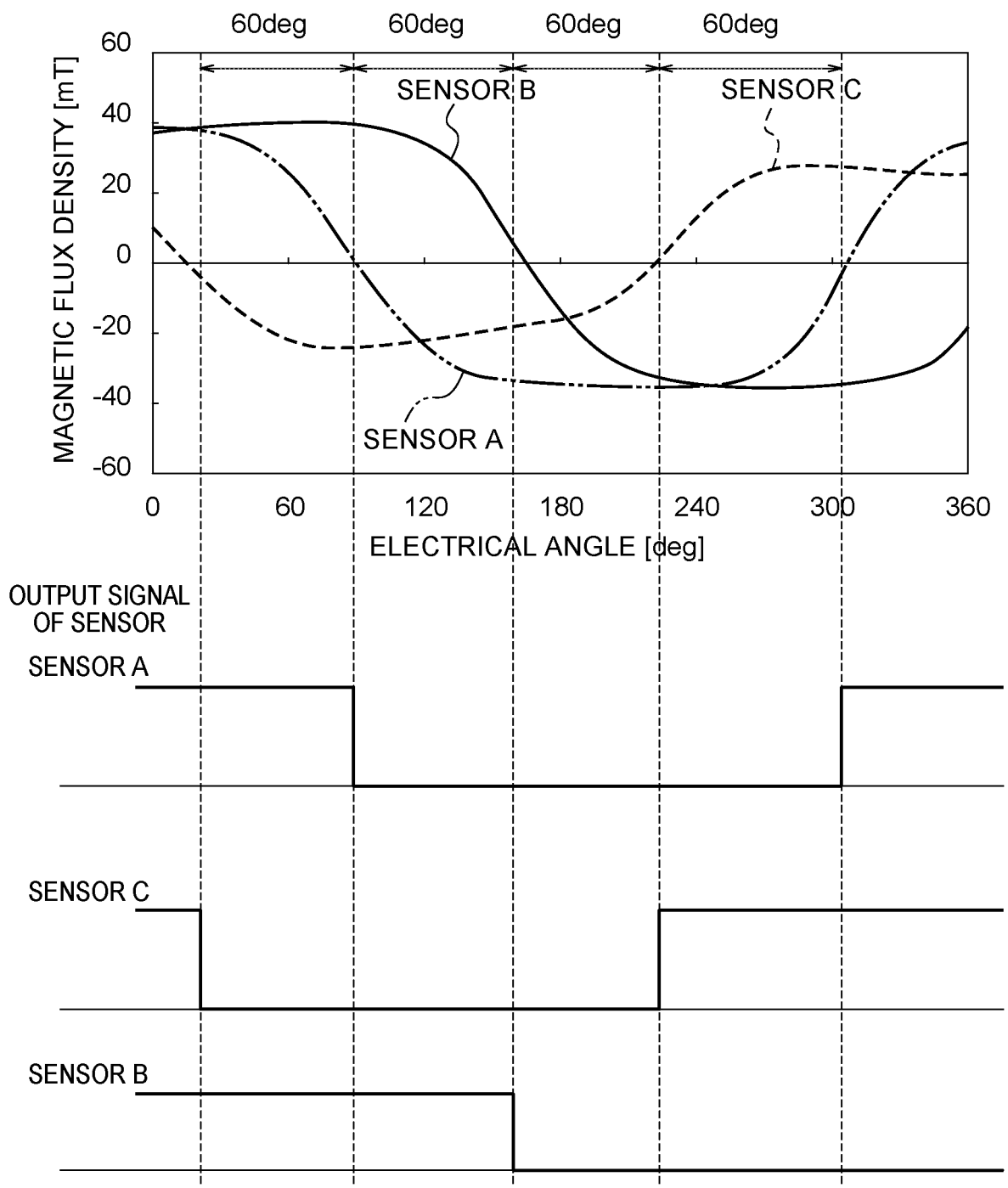
FIG. 12 is a timing chart showing a relationship between an electrical angle of the rotor in FIG. 1, and a magnetic flux density and an output signal in "sensor A", "sensor B", and "sensor C".

FIG. 12 is a timing chart showing a relationship between an electrical angle of the rotor 14, and a magnetic flux density and an output signal in "sensor A", "sensor B", and "sensor C". "Sensor A", "sensor B", and "sensor C" are arranged so as to enable determination of positive or negative of the magnetic flux density every 60 degrees in electrical angle. FIG. 12 shows a state in which "sensor C" is not influenced by the current.

Figure 13:
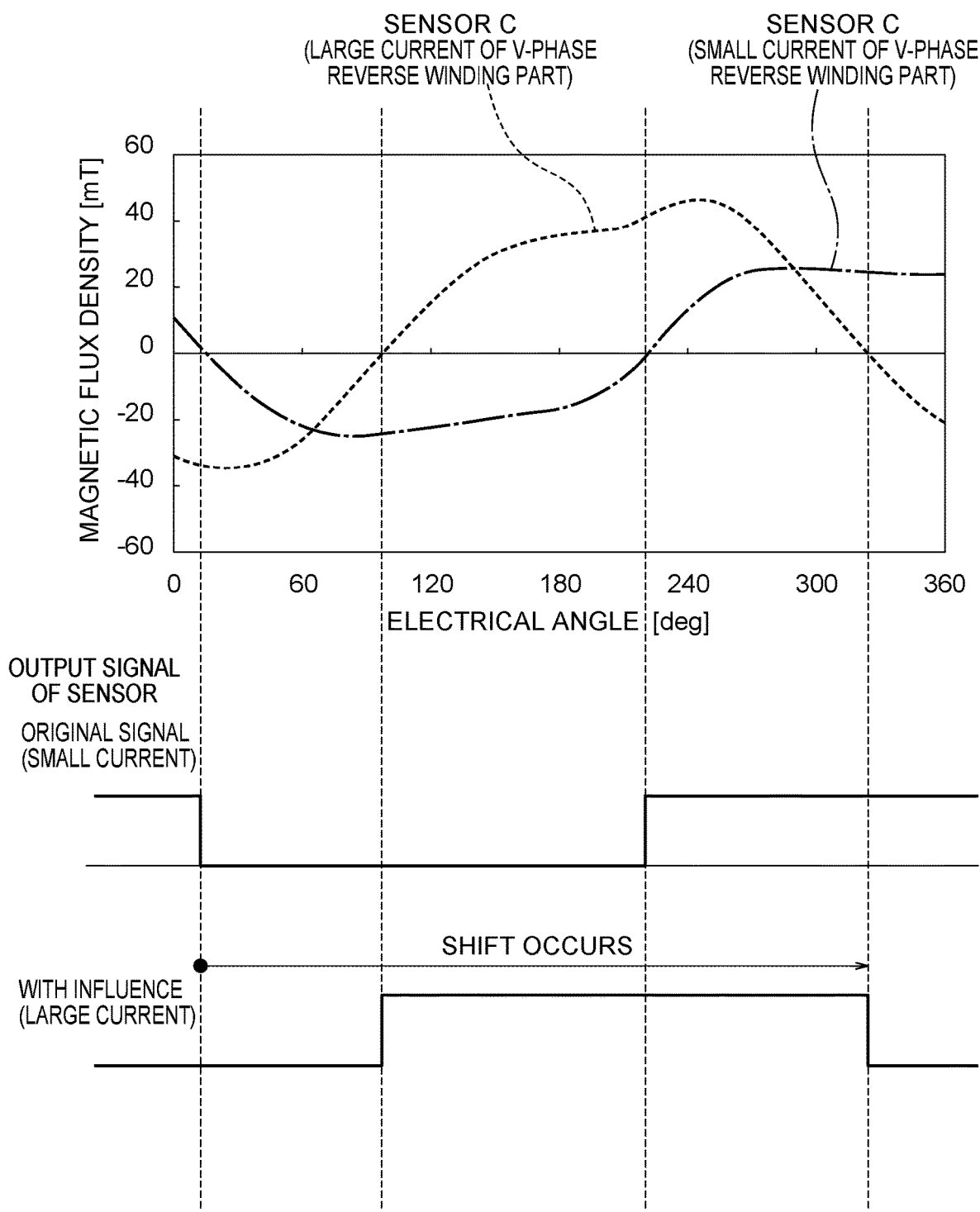
FIG. 13 is a timing chart showing a relationship between an electrical angle of the rotor, and a magnetic flux density and an output signal in "sensor C" in cases where a current of the wire-wound part in FIG. 1 is large and small.

FIG. 13 is a timing chart showing a relationship between an electrical angle of the rotor 14, and a magnetic flux density and an output signal in "sensor C" in cases where a current of the wire-wound part 32 is large and small. In a case where "sensor C" is influenced by the current, a significant shift occurs at a position for switching between High and Low of a signal waveform in relation to an original signal that is output in a case where there is no influence of the current. Therefore, under a condition that the current of the wire-wound part 32 (V-phase reverse winding part 32V') becomes large, the output signal of "sensor C" cannot be used since a detection accuracy of "sensor C" is worse than a detection accuracy of "sensor A" and "sensor B".

<Operation of Control Unit>

Therefore, in the present embodiment, the following control is performed so that the rotor 14 can be started and rotated based on magnetism detected by using the first magnetic induction member 68A, the second magnetic induction member 68B, and the third magnetic induction member 68C, and accordingly based on output signals of "sensor A", "sensor B", and "sensor C", even in a case where the first magnetic induction member 68A, the second magnetic induction member 68B, and the third magnetic induction member 68C are arranged in the characteristic arrangement described above.

In other words, at a start of rotation of the rotor 14, the control unit 72 provided in the control board 42 switches a timing of energizing the plurality of wire-wound parts 32 based on output signals of "sensor A", "sensor B", and "sensor C", or without using the output signals of "sensor A", "sensor B", and "sensor C". Whereas, at a time of normal rotation of the rotor 14, the control unit 72 switches a timing of energizing the plurality of wire-wound parts 32 based on an output signal of at least one of "sensor A" or "sensor B", without using an output signal of "sensor C". In either case of at a start of rotation and at a time of normal rotation of the rotor 14, the control unit 72 energizes the plurality of wire-wound parts 32 according to a three-phase full-wave sinusoidal wave conduction method. Hereinafter, Operation Examples 1 to 15 of the control unit 72 are shown.

Operation Example 1

Figure 14:
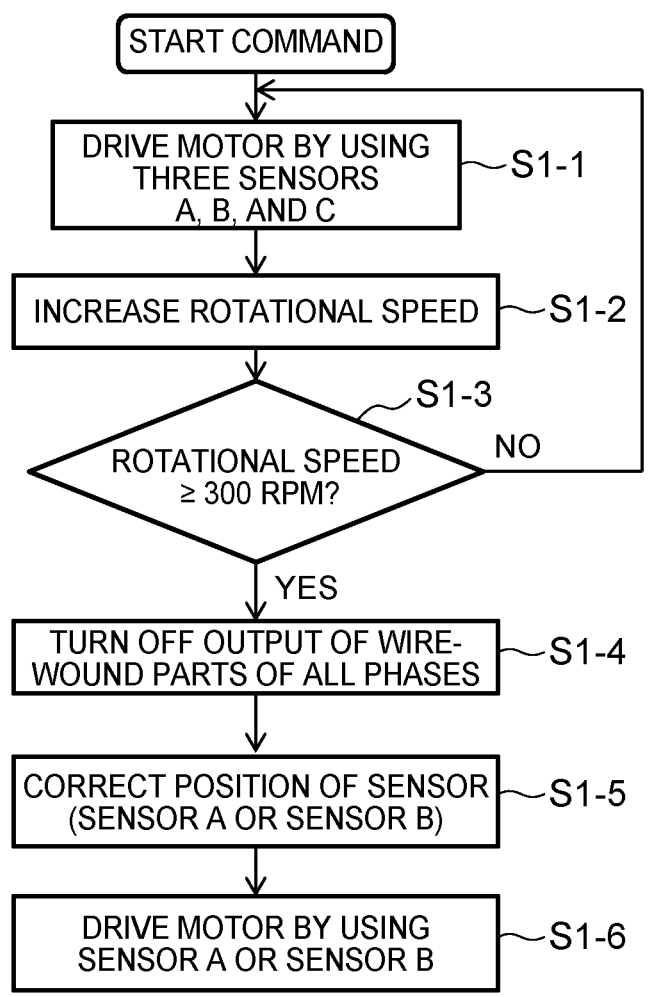
FIG. 14 is a flowchart showing Operation Example 1 of a control unit in FIG. 2.

Operation Example 1 of FIG. 14 starts from a state in which the rotor 14 is stopped. In Operation Example 1, when the control unit 72 receives a start command, the control unit 72 switches a timing of energizing the plurality of wire-wound parts 32 based on output signals of "sensor A", "sensor B", and "sensor C", and starts rotation of the rotor 14, in step S1-1.

In step S1-2, the control unit 72 advances switching of the timing of energizing the plurality of wire-wound parts 32, and increases a rotational speed of the rotor 14.

In step S1-3, the control unit 72 determines whether or not the rotational speed of the rotor 14 is a predetermined rotational speed or higher. At this time, the control unit 72 repeatedly executes steps S1-1 to S1-3 until the rotational speed reaches a speed that allows reading of an induced voltage of the wire-wound parts 32 of the U-phase, V-phase, and W-phase. Here, as an example, the predetermined rotational speed is set to 300 rpm. Then, in a case where the control unit 72 determines that the rotational speed of the rotor 14 is the predetermined rotational speed or higher, the process proceeds to step S1-4.

In step S1-4, the control unit 72 turns off an output of the wire-wound parts 32 of all phases of the U-phase, the V-phase, and the W-phase.

In step S1-5, the control unit 72 corrects a position of "sensor A" or "sensor B". Here, in order to reduce influence due to variations in the position of "sensor A" or "sensor B" at a time of assembly, an output signal of "sensor A" or "sensor B" is compared with a corresponding induced voltage of the wire-wound part 32, and the position of "sensor A" or "sensor B" is corrected such that phases of the output signal and the induced voltage are matched.

In step S1-6, the control unit 72 reduces the number of sensors to be used, switches a timing of energizing the plurality of wire-wound parts 32 based on the output signal of "sensor A" or "sensor B", and rotates the rotor 14 at a normal rotational speed.

Operation Example 2

Figure 15:
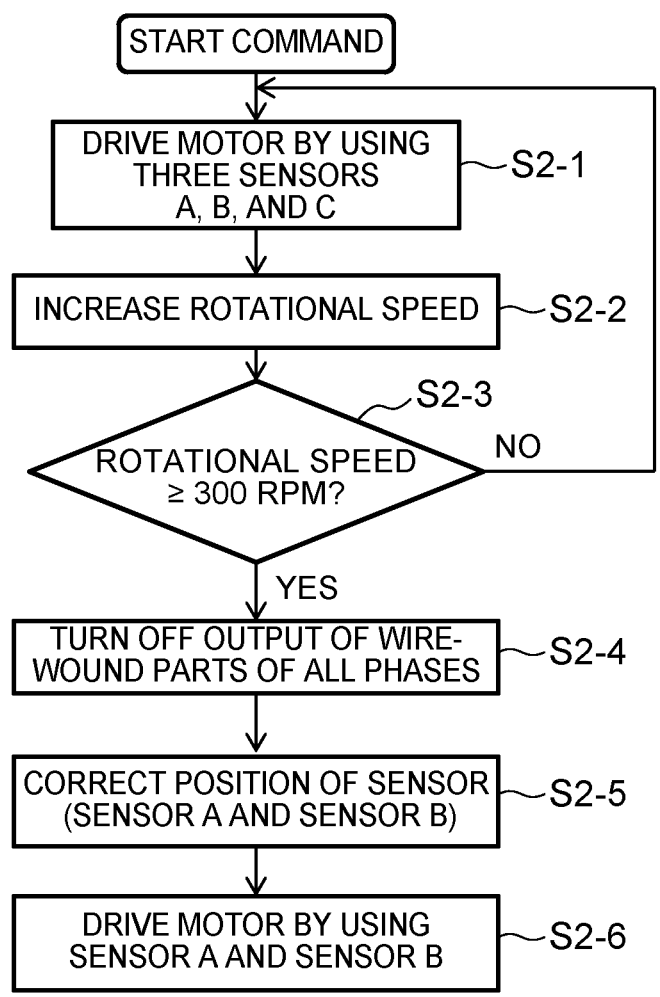
FIG. 15 is a flowchart showing Operation Example 2 of the control unit in FIG. 2.

Operation Example 2 of FIG. 15 starts from a state in which the rotor 14 is stopped. In Operation Example 2, steps S2-1 to S2-4 are the same as steps S1-1 to S1-4 in Operation Example 1 described above.

In step S2-5, the control unit 72 corrects positions of "sensor A" and "sensor B". Here, in order to reduce influence due to variations in the positions of "sensor A" and "sensor B" at a time of assembly, output signals of "sensor A" and "sensor B" are compared with a corresponding induced voltage of the wire-wound part 32, and the positions of "sensor A" and "sensor B" are corrected such that phases of the output signals and the induced voltage are matched.

In step S2-6, the control unit 72 reduces the number of sensors to be used, switches a timing of energizing the plurality of wire-wound parts 32 based on the output signals of "sensor A" and "sensor B", and rotates the rotor 14 at a normal rotational speed.

Operation Example 3

Figure 16:
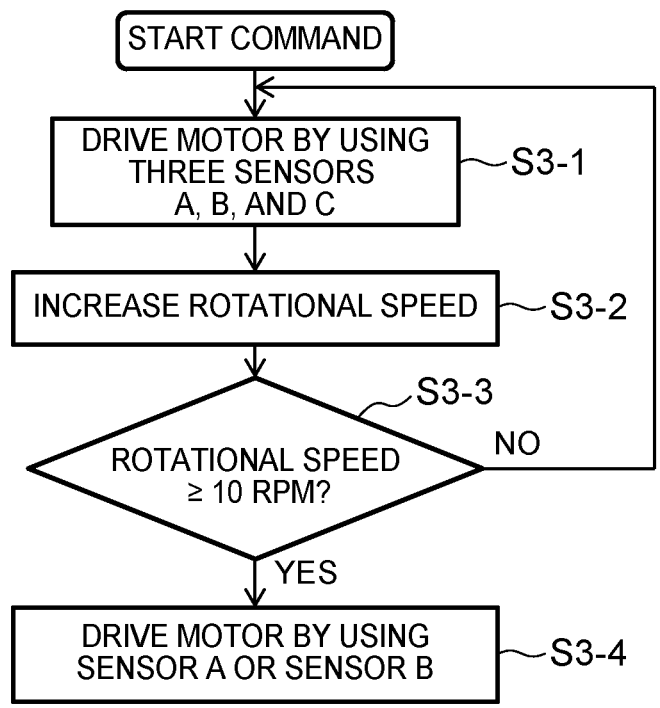
FIG. 16 is a flowchart showing Operation Example 3 of the control unit in FIG. 2.

Operation Example 3 of FIG. 16 starts from a state in which the rotor 14 is stopped. In Operation Example 3, steps S3-1 to S3-2 are the same as steps S1-1 to S1-2 in Operation Example 1 described above.

In step S3-3, the control unit 72 determines whether or not a rotational speed of the rotor 14 is a predetermined rotational speed or higher. At this time, until determining that the rotational speed of the rotor 14 is equal to or higher than a speed allowing speed measurement (allowing cycle measurement) with the control unit 72 (microcomputer), the control unit 72 repeatedly executes steps S3-1 to S3-3. Here, as an example, the predetermined rotational speed is set to 10 rpm. Then, in a case where the control unit 72 determines that the rotational speed of the rotor 14 is the predetermined rotational speed or higher, the process proceeds to step S3-4.

In step S3-4, the control unit 72 reduces the number of sensors to be used, switches a timing of energizing the plurality of wire-wound parts 32 based on an output signal of "sensor A" or "sensor B", and rotates the rotor 14 at a normal rotational speed.

Operation Example 4

Figure 17:
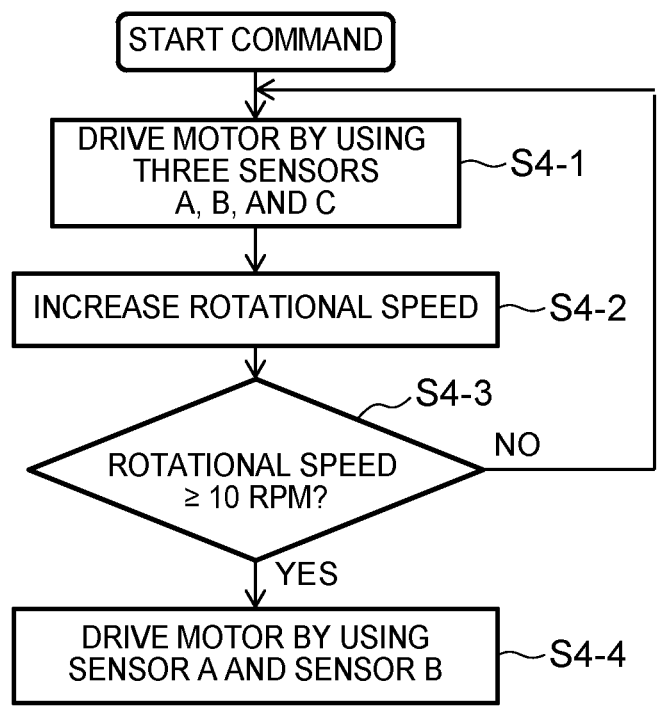
FIG. 17 is a flowchart showing Operation Example 4 of the control unit in FIG. 2.

Operation Example 4 of FIG. 17 starts from a state in which the rotor 14 is stopped. In Operation Example 4, steps S4-1 to S4-3 are the same as steps S3-1 to S1-3 in Operation Example 3 described above.

In step S4-4, the control unit 72 reduces the number of sensors to be used, switches a timing of energizing the plurality of wire-wound parts 32 based on output signals of "sensor A" and "sensor B", and rotates the rotor 14 at a normal rotational speed.

Operation Example 5

Figure 18:
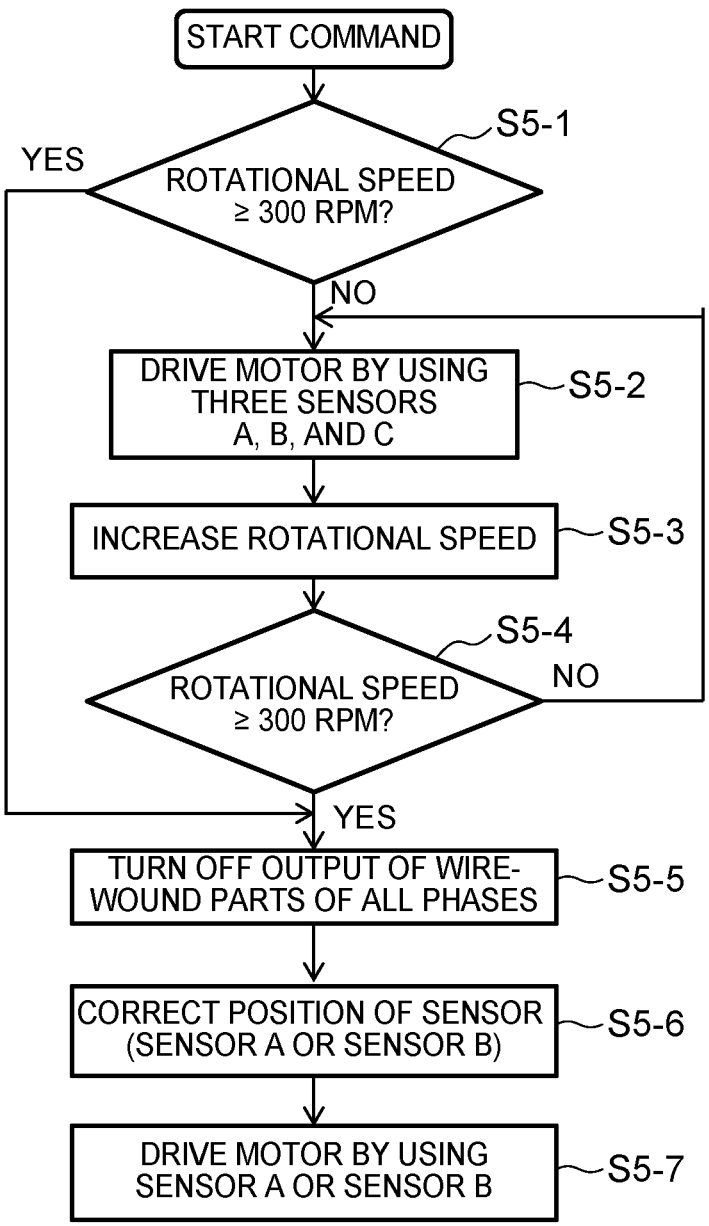
FIG. 18 is a flowchart showing Operation Example 5 of the control unit in FIG. 2.

Operation Example 5 of FIG. 18 starts from a state in which the rotor 14 is in idle. In Operation Example 5, when the control unit 72 receives a start command, the control unit 72 determines whether or not a rotational speed of the rotor 14 is a predetermined rotational speed or higher, in step S5-1. Here, as an example, the predetermined rotational speed is set to 300 rpm. Then, in a case where the control unit 72 determines that the rotational speed of the rotor 14 is the predetermined rotational speed or higher, the process proceeds to step S5-5. Whereas, in a case where the control unit 72 determines that the rotational speed of the rotor 14 is less than the predetermined rotational speed, the process proceeds to step S5-2.

In step S5-2, the control unit 72 switches a timing of energizing the plurality of wire-wound parts 32 based on output signals of "sensor A", "sensor B", and "sensor C", and starts rotation of the rotor 14.

In step S5-3, the control unit 72 advances switching of the timing of energizing the plurality of wire-wound parts 32, and increases the rotational speed of the rotor 14.

In step S5-4, the control unit 72 determines whether or not the rotational speed of the rotor 14 is a predetermined rotational speed or higher. At this time, the control unit 72 repeatedly executes steps S5-2 to S5-4 until the rotational speed reaches a speed that allows reading of an induced voltage of the wire-wound parts 32 of the U-phase, V-phase, and W-phase. Here, as an example, the predetermined rotational speed is set to 300 rpm similarly to step S5-1. Then, in a case where the control unit 72 determines that the rotational speed of the rotor 14 is the predetermined rotational speed or higher, the process proceeds to step S5-5.

In step S5-5, the control unit 72 turns off an output of the wire-wound parts 32 of all phases of the U-phase, the V-phase, and the W-phase.

In step S5-6, the control unit 72 corrects a position of "sensor A" or "sensor B". Here, in order to reduce influence due to variations in the position of "sensor A" or "sensor B" at a time of assembly, an output signal of "sensor A" or "sensor B" is compared with a corresponding induced voltage of the wire-wound part 32, and the position of "sensor A" or "sensor B" is corrected such that phases of the output signal and the induced voltage are matched.

In step S5-7, the control unit 72 reduces the number of sensors to be used, switches a timing of energizing the plurality of wire-wound parts 32 based on the output signal of "sensor A" or "sensor B", and rotates the rotor 14 at a normal rotational speed.

Operation Example 6

Figure 19:
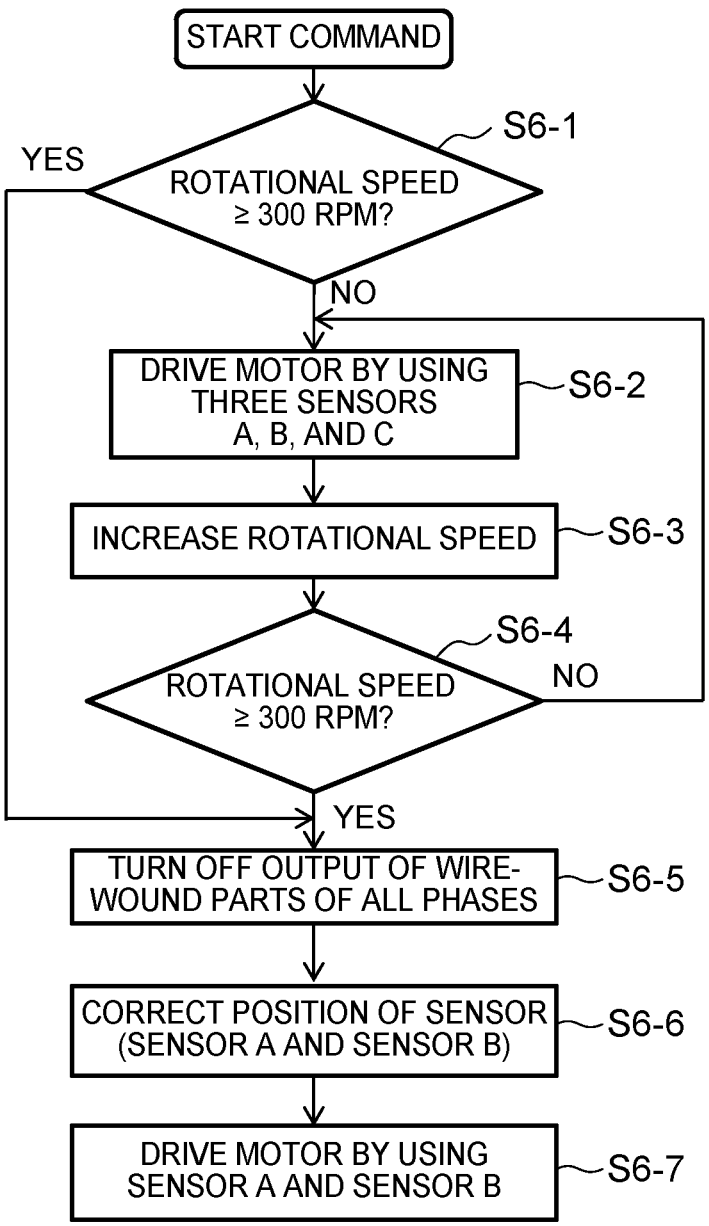
FIG. 19 is a flowchart showing Operation Example 6 of the control unit in FIG. 2.

Operation Example 6 of FIG. 19 starts from a state in which the rotor 14 is in idle. In Operation Example 6, steps S6-1 to S6-5 are the same as steps S5-1 to S5-5 in Operation Example 5 described above.

In step S6-6, the control unit 72 corrects positions of "sensor A" and "sensor B". Here, in order to reduce influence due to variations in the positions of "sensor A" and "sensor B" at a time of assembly, output signals of "sensor A" and "sensor B" are compared with a corresponding induced voltage of the wire-wound part 32, and the positions of "sensor A" and "sensor B" are corrected such that phases of the output signals and the induced voltage are matched.

In step S6-7, the control unit 72 reduces the number of sensors to be used, switches a timing of energizing the plurality of wire-wound parts 32 based on the output signals of "sensor A" and "sensor B", and rotates the rotor 14 at a normal rotational speed.

Operation Example 7

Figure 20:
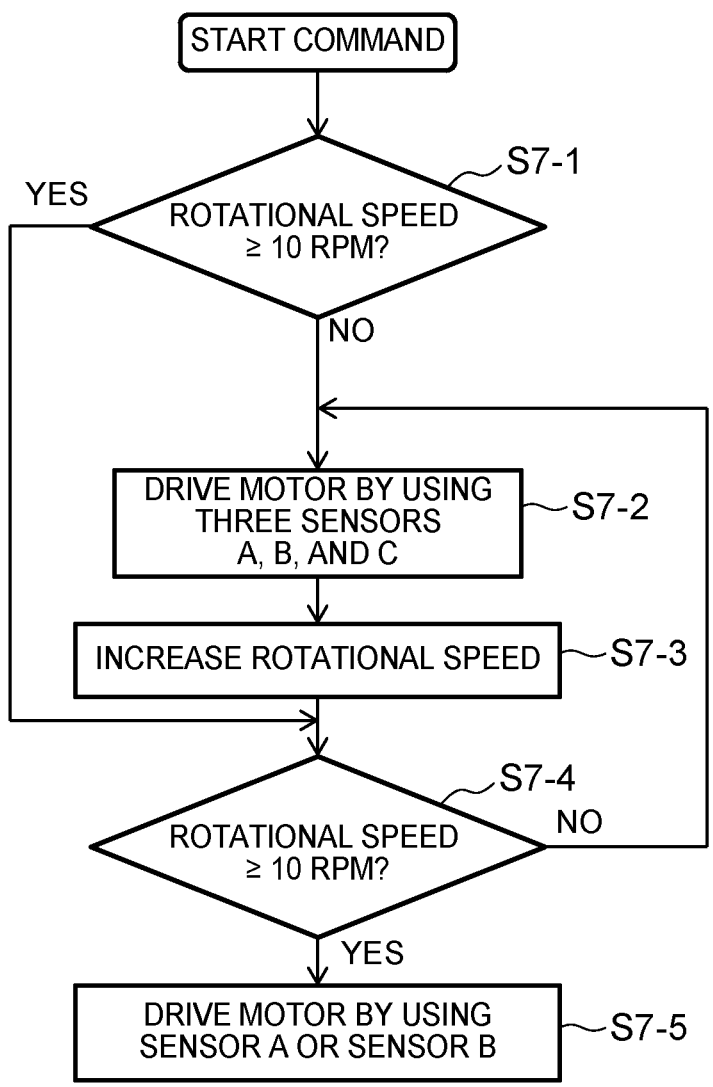
FIG. 20 is a flowchart showing Operation Example 7 of the control unit in FIG. 2.

Operation Example 7 of FIG. 20 starts from a state in which the rotor 14 is in idle. In Operation Example 7, when the control unit 72 receives a start command, it is determined whether or not a rotational speed of the rotor 14 is a predetermined rotational speed or higher, in step S7-1. At this time, until determining that the rotational speed of the rotor 14 is equal to or higher than a speed allowing speed measurement (allowing cycle measurement) with the control unit 72 (microcomputer), the control unit 72 repeatedly executes step S7-1. Here, as an example, the predetermined rotational speed is set to 10 rpm. Then, in a case where the control unit 72 determines that the rotational speed of the rotor 14 is the predetermined rotational speed or higher, the process proceeds to step S7-4. Whereas, in a case where the control unit 72 determines that the rotational speed of the rotor 14 is less than the predetermined rotational speed, the process proceeds to step S7-2.

In step S7-2, the control unit 72 switches a timing of energizing the plurality of wire-wound parts 32 based on output signals of "sensor A", "sensor B", and "sensor C", and starts rotation of the rotor 14.

In step S7-3, the control unit 72 advances switching of the timing of energizing the plurality of wire-wound parts 32, and increases the rotational speed of the rotor 14.

In step S7-4, the control unit 72 determines whether or not the rotational speed of the rotor 14 is a predetermined rotational speed or higher. At this time, until determining that the rotational speed of the rotor 14 is equal to or higher than a speed allowing speed measurement (allowing cycle measurement) with the control unit 72 (microcomputer), the control unit 72 repeatedly executes steps S7-2 to S7-4. Here, as an example, the predetermined rotational speed is set to 10 rpm. Then, in a case where the control unit 72 determines that the rotational speed of the rotor 14 is the predetermined rotational speed or higher, the process proceeds to step S7-5.

In step S7-5, the control unit 72 reduces the number of sensors to be used, switches a timing of energizing the plurality of wire-wound parts 32 based on an output signal of "sensor A" or "sensor B", and rotates the rotor 14 at a normal rotational speed.

Operation Example 8

Figure 21:
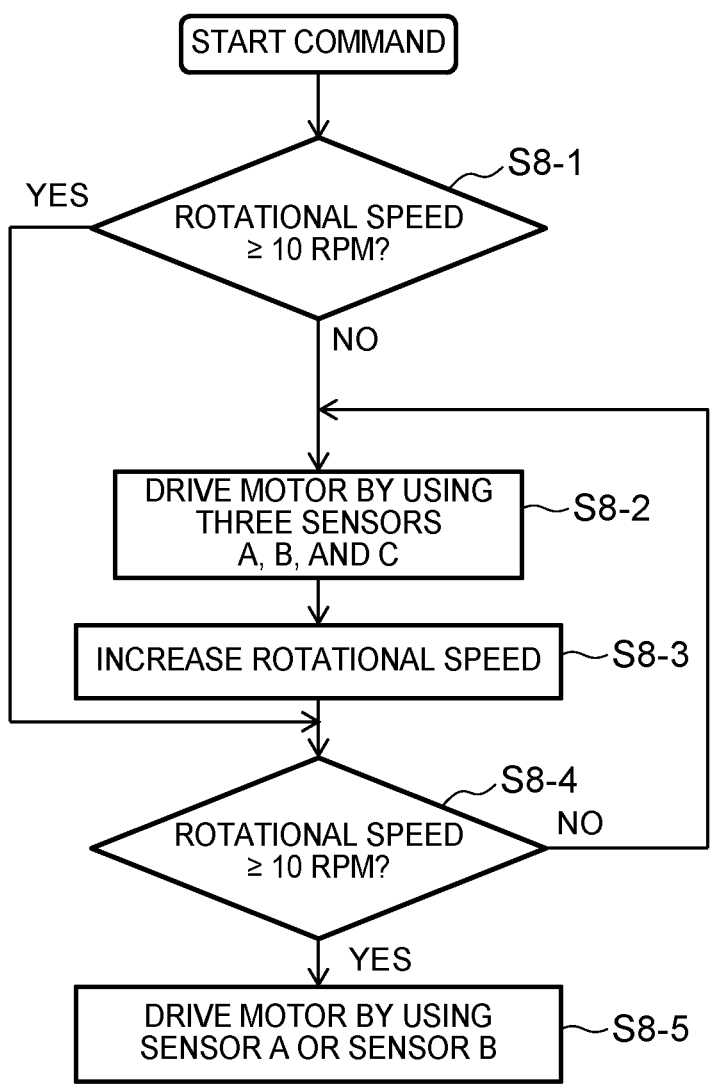
FIG. 21 is a flowchart showing Operation Example 8 of the control unit in FIG. 2.

In Operation Example 8 of FIG. 21, steps S8-1 to S8-4 are the same as steps S7-1 to S7-4 in the above Operation Example 7.

In step S8-5, the control unit 72 reduces the number of sensors to be used, switches a timing of energizing the plurality of wire-wound parts 32 based on output signals of "sensor A" or "sensor B", and rotates the rotor 14 at a normal rotational speed.

Operation Example 9

Figure 22:
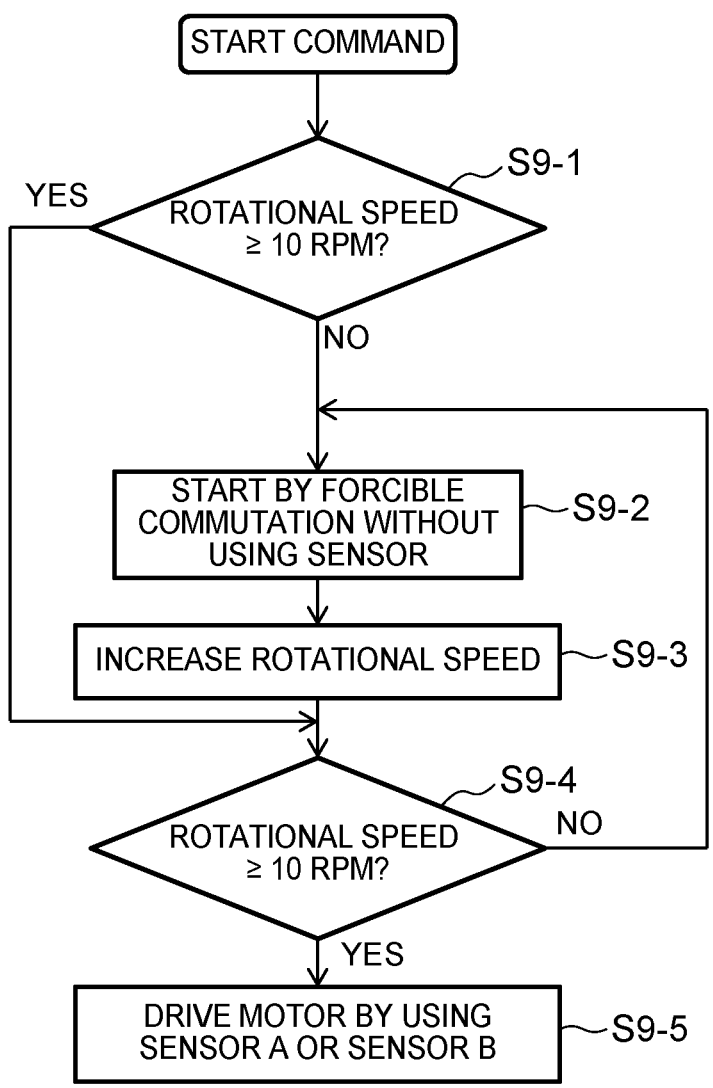
FIG. 22 is a flowchart showing Operation Example 9 of the control unit in FIG. 2.

Operation Example 9 of FIG. 22 starts from a state in which the rotor 14 is in idle. In Operation Example 9, when the control unit 72 receives a start command, it is determined whether or not a rotational speed of the rotor 14 is a predetermined rotational speed or higher, in step S9-1. At this time, until determining that the rotational speed of the rotor 14 is equal to or higher than a speed allowing speed measurement (allowing cycle measurement) with the control unit 72 (microcomputer), the control unit 72 repeatedly executes step S9-1. Here, as an example, the predetermined rotational speed is set to 10 rpm. Then, in a case where the control unit 72 determines that the rotational speed of the rotor 14 is the predetermined rotational speed or higher, the process proceeds to step S9-4. Whereas, in a case where the control unit 72 determines that the rotational speed of the rotor 14 is less than the predetermined rotational speed, the process proceeds to step S9-2.

In step S9-2, the control unit 72 forcibly switches (forcibly commutates) a timing of energizing the plurality of wire-wound parts 32 without using "sensor A", "sensor B", and "sensor C", and starts rotation of the rotor 14.

In step S9-3, the control unit 72 advances switching of the timing of energizing the plurality of wire-wound parts 32, and increases the rotational speed of the rotor 14.

In step S9-4, the control unit 72 determines whether or not the rotational speed of the rotor 14 is a predetermined rotational speed or higher. At this time, until determining that the rotational speed of the rotor 14 is equal to or higher than a speed allowing speed measurement (allowing cycle measurement) with the control unit 72 (microcomputer), the control unit 72 repeatedly executes steps S9-2 to S9-4. Here, as an example, the predetermined rotational speed is set to 10 rpm. Then, in a case where the control unit 72 determines that the rotational speed of the rotor 14 is the predetermined rotational speed or higher, the process proceeds to step S9-5.

In step S9-5, the control unit 72 switches a timing of energizing the plurality of wire-wound parts 32 based on an output signal of "sensor A" or "sensor B", and rotates the rotor 14 at a normal rotational speed.

Operation Example 10

Figure 23:
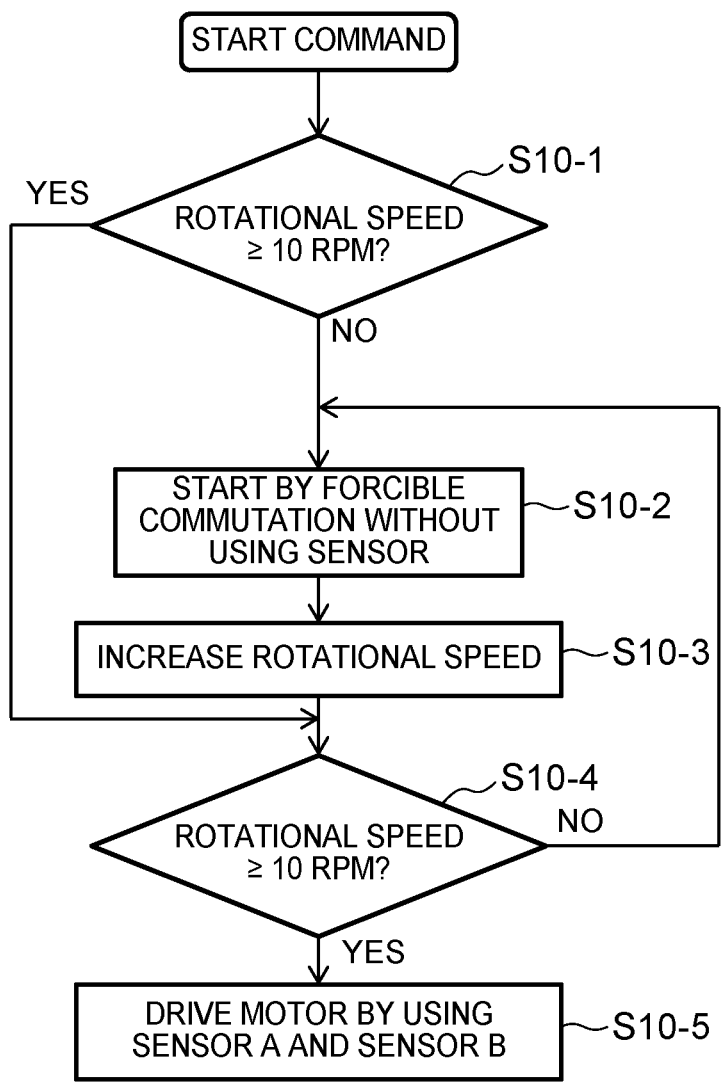
FIG. 23 is a flowchart showing Operation Example 10 of the control unit in FIG. 2.

In Operation Example 10 of FIG. 23, steps S10-1 to S10-4 are the same as steps S9-1 to S9-4 in Operation Example 9 described above.

In step S10-5, the control unit 72 switches a timing of energizing the plurality of wire-wound parts 32 based on output signals of "sensor A" and "sensor B", and rotates the rotor 14 at a normal rotational speed.

Operation Example 11

Figure 24:
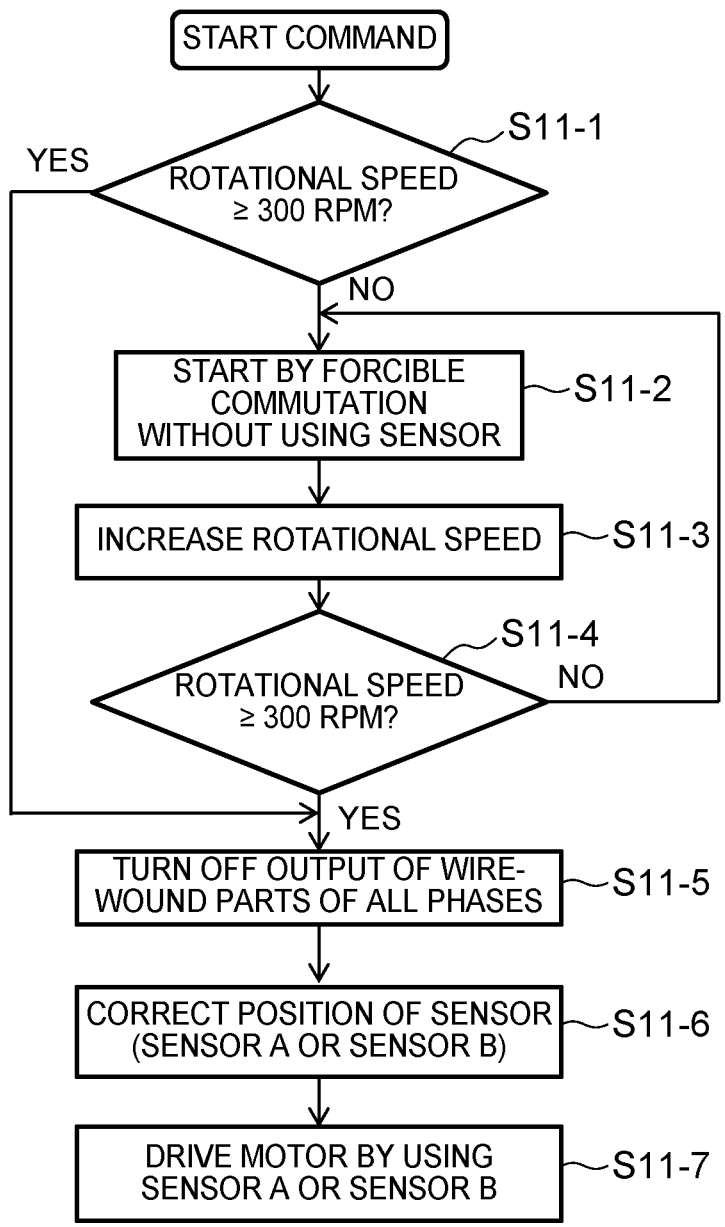
FIG. 24 is a flowchart showing Operation Example 11 of the control unit in FIG. 2.

Operation Example 11 of FIG. 24 starts from a state in which the rotor 14 is in idle. In Operation Example 11, when the control unit 72 receives a start command, the control unit 72 determines whether or not a rotational speed of the rotor 14 is a predetermined rotational speed or higher, in step S11-1. Here, as an example, the predetermined rotational speed is set to 300 rpm. Then, in a case where the control unit 72 determines that the rotational speed of the rotor 14 is the predetermined rotational speed or higher, the process proceeds to step S11-5. Whereas, in a case where the control unit 72 determines that the rotational speed of the rotor 14 is less than the predetermined rotational speed, the process proceeds to step S11-2.

In step S11-2, the control unit 72 forcibly switches (forcibly commutates) a timing of energizing the plurality of wire-wound parts 32 without using "sensor A", "sensor B", and "sensor C", and starts rotation of the rotor 14.

In step S11-3, the control unit 72 advances switching of the timing of energizing the plurality of wire-wound parts 32, and increases the rotational speed of the rotor 14.

In step S11-4, the control unit 72 determines whether or not the rotational speed of the rotor 14 is a predetermined rotational speed or higher. At this time, the control unit 72 repeatedly executes steps S11-2 to S11-4 until the rotational speed reaches a speed that allows reading of an induced voltage of the wire-wound parts 32 of the U-phase, V-phase, and W-phase. Here, as an example, the predetermined rotational speed is set to 300 rpm similarly to step S11-1. Then, in a case where the control unit 72 determines that the rotational speed of the rotor 14 is the predetermined rotational speed or higher, the process proceeds to step S11-5.

In step S11-5, the control unit 72 turns off an output of the wire-wound parts 32 of all phases of the U-phase, the V-phase, and the W-phase.

In step S11-6, the control unit 72 corrects a position of "sensor A" or "sensor B". Here, in order to reduce influence due to variations in the position of "sensor A" or "sensor B" at a time of assembly, an output signal of "sensor A" or "sensor B" is compared with a corresponding induced voltage of the wire-wound part 32, and the position of "sensor A" or "sensor B" is corrected such that phases of the output signal and the induced voltage are matched.

In step S11-7, the control unit 72 switches a timing of energizing the plurality of wire-wound parts 32 based on the output signal of "sensor A" or "sensor B", and rotates the rotor 14 at a normal rotational speed.

Operation Example 12

Figure 25:
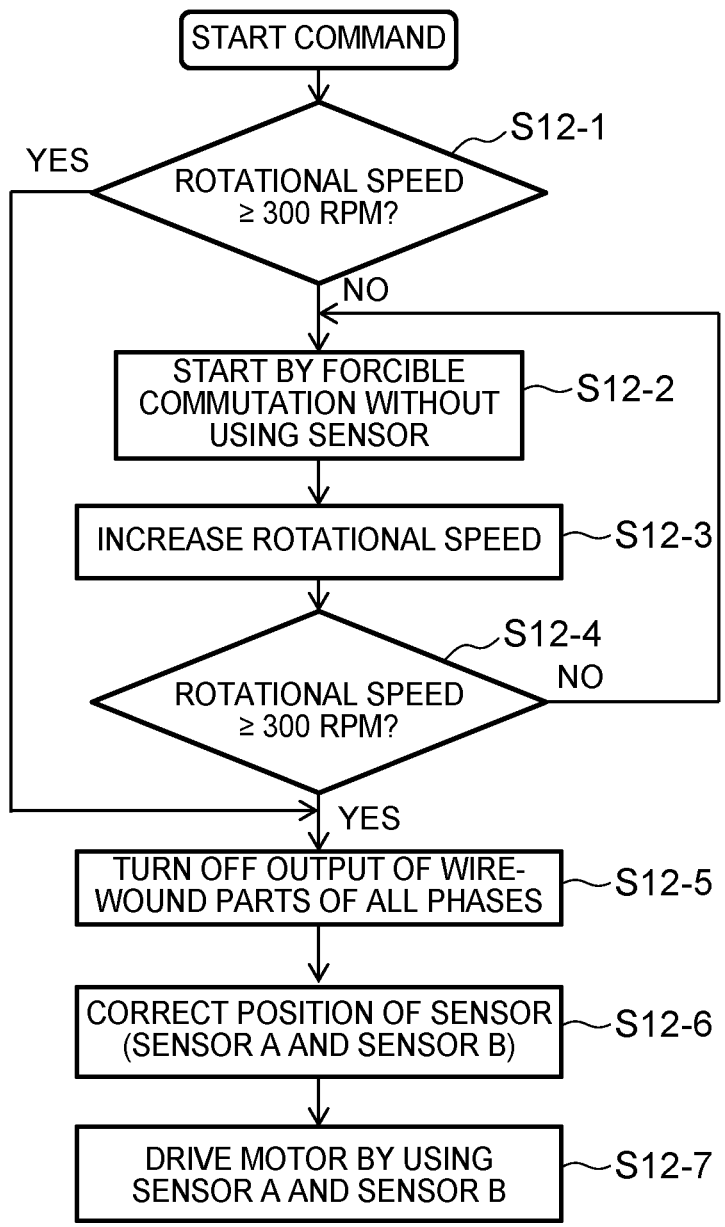
FIG. 25 is a flowchart showing Operation Example 12 of the control unit in FIG. 2.

In Operation Example 12 of FIG. 25, steps S12-1 to S12-5 are the same as steps S11-1 to S11-5 in Operation Example 11 described above.

In step S12-6, the control unit 72 corrects positions of "sensor A" and "sensor B". Here, in order to reduce influence due to variations in the positions of "sensor A" and "sensor B" at a time of assembly, output signals of "sensor A" and "sensor B" are compared with a corresponding induced voltage of the wire-wound part 32, and the positions of "sensor A" and "sensor B" are corrected such that phases of the output signals and the induced voltage are matched.

In step S12-7, the control unit 72 switches a timing of energizing the plurality of wire-wound parts 32 based on the output signals of "sensor A" and "sensor B", and rotates the rotor 14 at a normal rotational speed.

Operation Example 13

Figure 26:
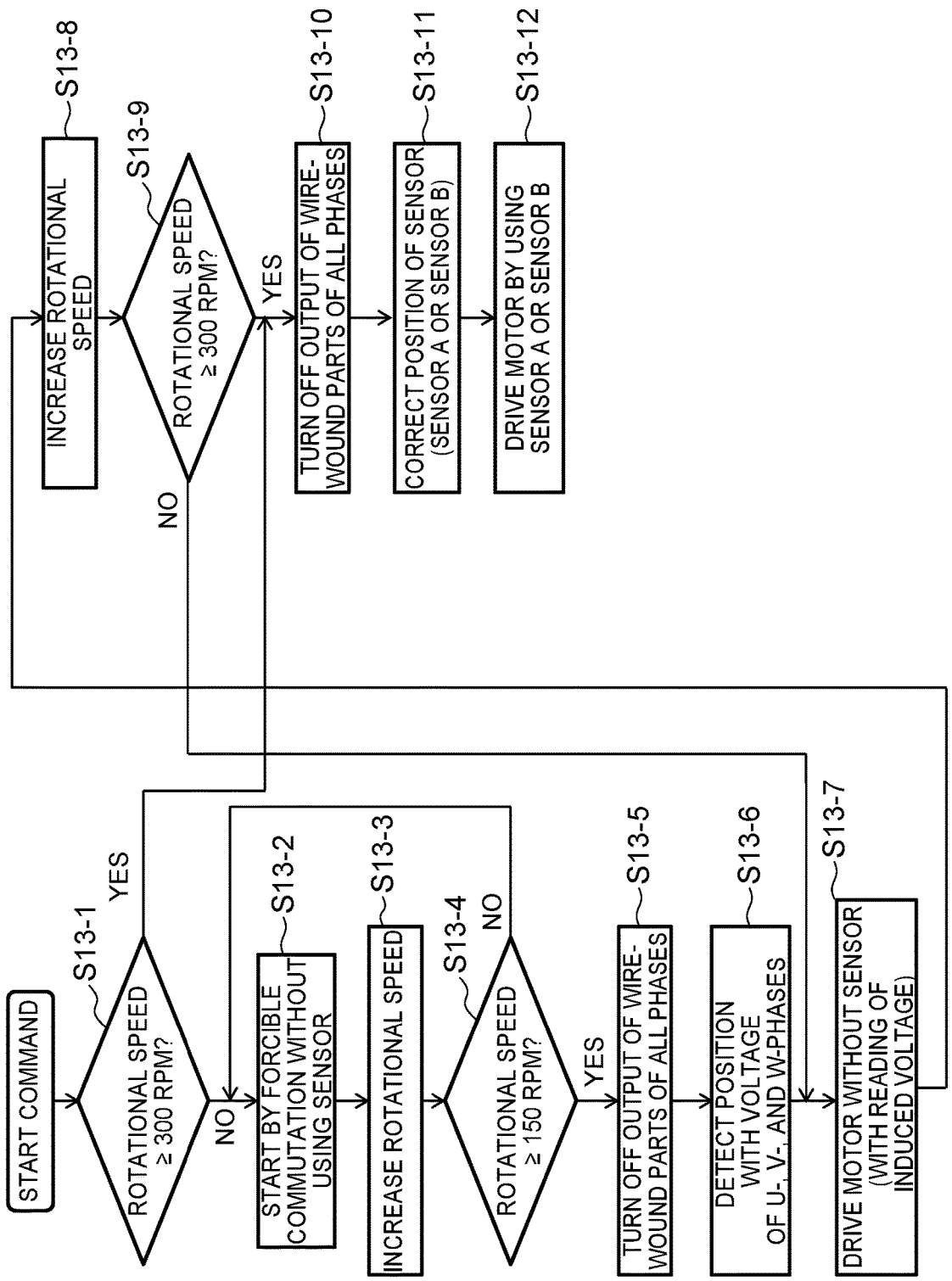
FIG. 26 is a flowchart showing Operation Example 13 of the control unit in FIG. 2.

Operation Example 13 of FIG. 26 starts from a state in which the rotor 14 is in idle. In Operation Example 13, when the control unit 72 receives a start command, the control unit 72 determines whether or not a rotational speed of the rotor 14 is a predetermined rotational speed or higher, in step S13-1. Here, as an example, the predetermined rotational speed is set to 300 rpm. Then, in a case where the control unit 72 determines that the rotational speed of the rotor 14 is the predetermined rotational speed or higher, the process proceeds to step S13-10. Whereas, in a case where the control unit 72 determines that the rotational speed of the rotor 14 is less than the predetermined rotational speed, the process proceeds to step S13-2.

In step S13-2, the control unit 72 forcibly switches (forcibly commutates) a timing of energizing the plurality of wire-wound parts 32 without using "sensor A", "sensor B", and "sensor C", and starts rotation of the rotor 14.

In step S13-3, the control unit 72 advances switching of the timing of energizing the plurality of wire-wound parts 32, and increases the rotational speed of the rotor 14.

In step S13-4, the control unit 72 determines whether or not the rotational speed of the rotor 14 is a predetermined rotational speed or higher. At this time, the control unit 72 repeatedly executes steps S13-2 to S13-4 until the rotational speed reaches a speed that allows reading of an induced voltage of the wire-wound parts 32 of the U-phase, V-phase, and W-phase. Here, as an example, the predetermined rotational speed is set to 150 rpm. Then, in a case where the control unit 72 determines that the rotational speed of the rotor 14 is the predetermined rotational speed or higher, the process proceeds to step S13-5.

In step S13-5, the control unit 72 turns off an output of the wire-wound parts 32 of all phases of the U-phase, the V-phase, and the W-phase.

In step S13-6, the control unit 72 reads the induced voltage of the wire-wound parts 32 of the U-phase, V-phase, and W-phase, and detects a rotational position of the rotor 14.

In step S13-7, without using "sensor A", "sensor B", and "sensor C", the control unit 72 switches a timing of energizing the plurality of wire-wound parts 32 based on the read-out result of the induced voltage of the wire-wound parts 32 of the U-phase, V-phase and W-phase, and starts rotation of the rotor 14.

In step S13-8, the control unit 72 advances switching of the timing of energizing the plurality of wire-wound parts 32, and increases the rotational speed of the rotor 14.

In step S13-9, the control unit 72 determines whether or not the rotational speed of the rotor 14 is a predetermined rotational speed or higher. At this time, the control unit 72 repeatedly executes steps S13-7 to S13-9 until the rotational speed reaches a speed that allows reading of an induced voltage of the wire-wound parts 32 of the U-phase, V-phase, and W-phase. Here, as an example, the predetermined rotational speed is set to 300 rpm. Then, in a case where the control unit 72 determines that the rotational speed of the rotor 14 is the predetermined rotational speed or higher, the process proceeds to step S13-10.

In step S13-10, the control unit 72 turns off an output of the wire-wound parts 32 of all phases of the U-phase, the V-phase, and the W-phase.

In step S13-11, the control unit 72 corrects a position of "sensor A" or "sensor B". Here, in order to reduce influence due to variations in the position of "sensor A" or "sensor B" at a time of assembly, an output signal of "sensor A" or "sensor B" is compared with a corresponding induced voltage of the wire-wound part 32, and the position of "sensor A" or "sensor B" is corrected such that phases of the output signal and the induced voltage are matched.

In step S13-12, the control unit 72 switches a timing of energizing the plurality of wire-wound parts 32 based on the output signal of "sensor A" or "sensor B", and rotates the rotor 14 at a normal rotational speed.

Operation Example 14

Figure 27:
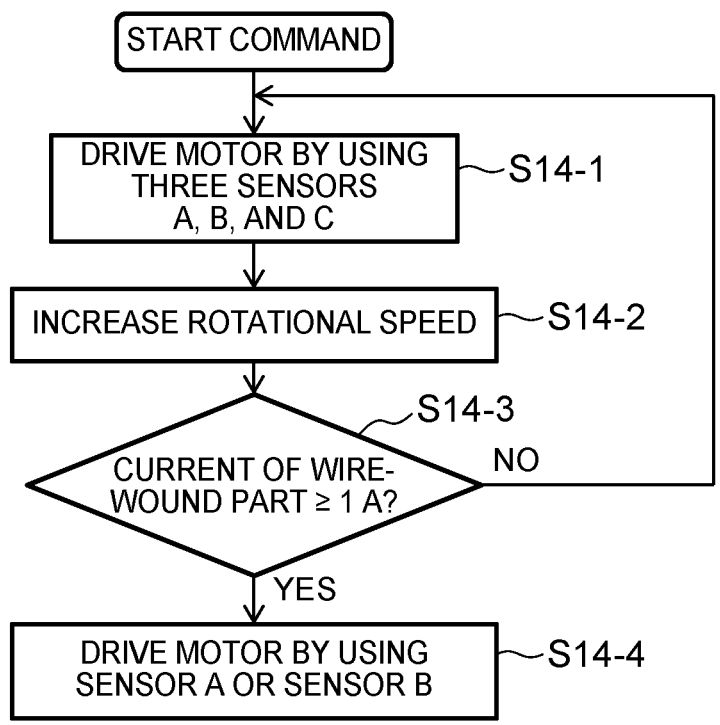
FIG. 27 is a flowchart showing Operation Example 14 of the control unit in FIG. 2.

Operation Example 14 of FIG. 27 starts from a state in which the rotor 14 is stopped. In Operation Example 14, when the control unit 72 receives a start command, the control unit 72 switches a timing of energizing the plurality of wire-wound parts 32 based on output signals of "sensor A", "sensor B", and "sensor C", and starts rotation of the rotor 14, in step S14-1.

In step S14-2, the control unit 72 advances switching of the timing of energizing the plurality of wire-wound parts 32, and increases a rotational speed of the rotor 14.

In step S14-3, the control unit 72 determines whether or not a current flowing through the plurality of wire-wound parts 32 is a predetermined current value or higher. At this time, the control unit 72 repeatedly executes steps S14-1 to S14-3 until determining that the current flowing through the plurality of wire-wound parts 32 is the predetermined current value or higher. As shown in FIG. 11, the predetermined current value is set to a current value in a state before noise occurs in a waveform of a magnetic flux density in "sensor C" due to the current flowing through the plurality of wire-wound parts 32. In this case, the predetermined current value is set to 1 A as an example. Then, in a case where the control unit 72 determines that the current flowing through the plurality of wire-wound parts 32 is the predetermined current value or higher, the process proceeds to step S14-4.

In step S14-4, the control unit 72 reduces the number of sensors to be used, switches a timing of energizing the plurality of wire-wound parts 32 based on an output signal of "sensor A" or "sensor B", and rotates the rotor 14 at a normal rotational speed.

Operation Example 15

Figure 28:
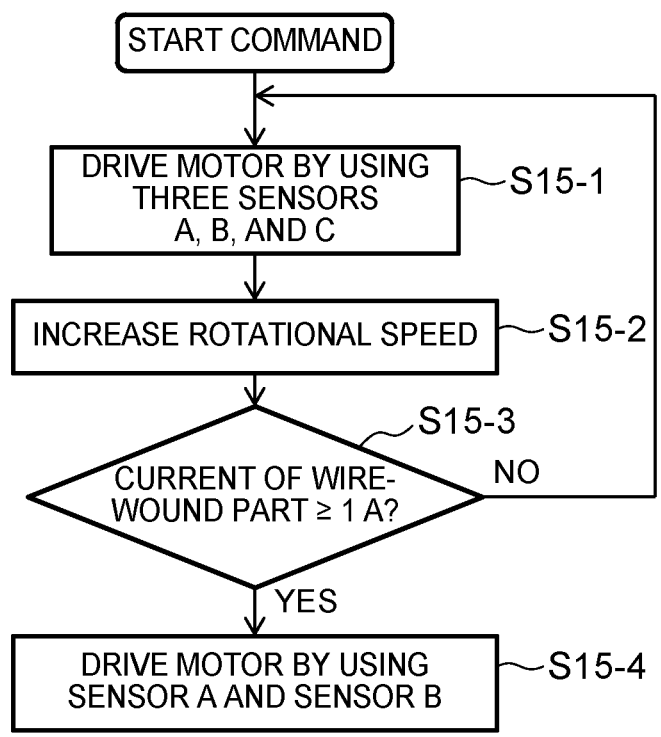
FIG. 28 is a flowchart showing Operation Example 15 of the control unit in FIG. 2.

Operation Example 15 of FIG. 28 starts from a state in which the rotor 14 is stopped. In Operation Example 15, steps S15-1 to S15-3 are the same as steps S14-1 to S14-3 in Operation Example 14 described above.

In step S15-4, the control unit 72 reduces the number of sensors to be used, switches a timing of energizing the plurality of wire-wound parts 32 based on output signals of "sensor A" and "sensor B", and rotates the rotor 14 at a normal rotational speed.

Hereinafter, operation and effect of one embodiment of the present invention will be described.

As described in detail above, according to the brushless motor 10 according to one embodiment of the invention, the resin-made connector member 44 is fixed to the center piece 18, and the plurality of magnetic induction members 68 are held by the connector member 44. Therefore, since the resin portion of the connector member 44 can be interposed between the metal center piece 18 and the plurality of magnetic induction members 68, it is possible to accurately detect magnetism.

In addition, since the center piece 18 is made of metal, rigidity of the center piece 18 can be secured as compared with a case where the center piece 18 is made of resin.

The opening 48 penetrating in the thickness direction of the plate-like portion 38 is formed in the plate-like portion 38, and the plurality of magnetic induction members 68 extend from a side of the rotor magnet 22 to a side of the magnetic detection sensor 46 through the opening 48. Therefore, each magnetic induction member 68 can be formed linearly, and magnetism can be induced from the rotor magnet 22 side to the control board 42 side with a short route, so that the structure can be simplified.

The connector member 44 is formed with the lid part 56 that holds the plurality of magnetic induction members 68 and closes the opening 48, and sealing is provided between the peripheral portion of the opening 48 and the lid part 56. Therefore, entry of water from the rotor 14 side through the opening 48 toward the control board 42 side can be suppressed.

Figure 6:
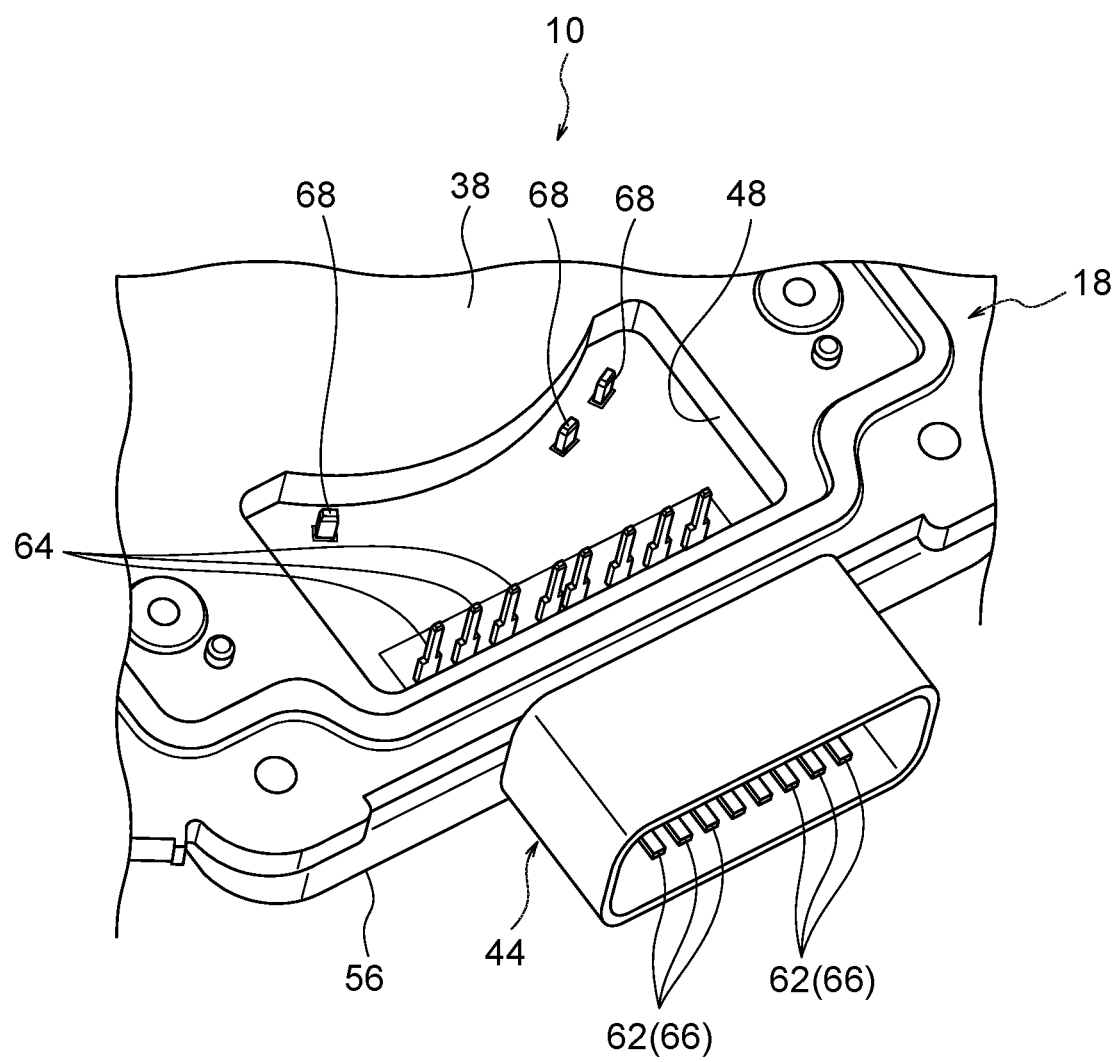
FIG. 6 is a perspective view of a peripheral portion of an opening of FIGS. 3 and 4 as seen from a back side of a plate-like portion.

Each of the plurality of magnetic induction members 68 extends from a side of the rotor magnet 22 to a side of each magnetic detection sensor 46 through the opening 48 that is common (see FIGS. 4, 6, and the like). Therefore, for example, as compared with a case where a plurality of openings corresponding to the respective magnetic induction members 68 are formed in the plate-like portion 38, it is possible to improve rigidity of the plate-like portion 38, and accordingly rigidity of the entire center piece 18.

As shown in FIG. 7, by devising such that the third magnetic induction member 68C is displaced to the second magnetic induction member 68B side with respect to the first magnetic induction member 68A by an amount corresponding to 120 degrees in electrical angle of the rotor 14, the first magnetic induction member 68A, the second magnetic induction member 68B, and the third magnetic induction member 68C are arranged close to each other. Therefore, a size of the opening 48 shown in FIGS. 3 and 4, and the like can be made small, which also makes it possible to improve rigidity of the plate-like portion 38, and accordingly rigidity of the entire center piece 18.

Further, by reducing the size of the opening 48, a size of the lid part 56 can also be reduced, so that the connector member 44 can be downsized.

The lid part 56 is formed with the plurality of holding parts 70 that holds the plurality of magnetic induction members 68, and these plurality of holding parts 70 protrude to the stator 12 side with respect to the surrounding part of the plurality of holding parts 70 in the lid part 56. Therefore, the plurality of magnetic induction members 68 can be arranged closer to the rotor magnet 22, thereby making it possible to more accurately induce magnetism generated from the rotor magnet 22 to the magnetic detection sensor 46.

In addition, since the center piece 18 is made of metal, it is possible to improve a heat dissipation property (cooling performance) of the control board 42 disposed opposing the plate-like portion 38, and improve a shielding property against electromagnetic noise.

In Operation Examples 1 to 4, 14, and 15, at a start of rotation of the rotor 14, the control unit 72 switches a timing of energizing the wire-wound parts 32 based on magnetism detected using the first magnetic induction member 68A, the second magnetic induction member 68B, and the third magnetic induction member 68C. Whereas, at a time of normal rotation of the rotor 14, the control unit 72 switches a timing of energizing the wire-wound parts 32 based on magnetism detected using at least one of the first magnetic induction member 68A or the second magnetic induction member 68B. As a result, even in a case where the first magnetic induction member 68A, the second magnetic induction member 68B, and the third magnetic induction member 68C are arranged close to each other as described above, it is possible to appropriately shift the rotor 14 from a rotation stating state to a normal rotation state while eliminating influence of a current of the wire-wound part 32.

In Operation Examples 5 to 13, at a start of rotation of the rotor 14, the control unit 72 forcibly switches a timing of energizing the wire-wound parts 32 without using the first magnetic induction member 68A, the second magnetic induction member 68B, and the third magnetic induction member 68C. Whereas, at a time of normal rotation of the rotor 14, the control unit 72 switches a timing of energizing the wire-wound parts 32 based on magnetism detected using at least one of the first magnetic induction member 68A or the second magnetic induction member 68B. As a result, similarly to Operation Examples 1 to 4, 14, and 15, even in a case where the first magnetic induction member 68A, the second magnetic induction member 68B, and the third magnetic induction member 68C are arranged close to each other as described above, it is possible to appropriately shift the rotor 14 from the rotation start stating to the normal rotation state while eliminating influence of a current of the wire-wound part 32.

In addition, the control unit 72 energizes the plurality of wire-wound parts 32 according to the three-phase full-wave sinusoidal wave conduction method. In this three-phase full-wave sinusoidal wave conduction method, a current flows through all the wire-wound parts 32. Therefore, by arranging the first magnetic induction member 68A and the second magnetic induction member 68B respectively on the lines LA and LB each bisecting the opening angle of the slot 36, it is possible to improve the magnetic detection accuracy of "sensor A" and "sensor B" by reducing influence of a current of the wire-wound part 32.

Further, the plurality of wire-wound parts 32 are delta-connected. Also in this delta connection, a current flows through all the wire-wound parts 32. Therefore, similarly to the three-phase full-wave sinusoidal wave conduction method described above, by arranging the first magnetic induction member 68A and the second magnetic induction member 68B respectively on the lines LA and LB each bisecting the opening angle of the slot 36, it is possible to reduce influence of a current of the wire-wound part 32, and improve the magnetic detection accuracy of "sensor A" and "sensor B".

Hereinafter, modifications of one embodiment of the invention will be described.

In the above embodiment, the space between the peripheral portion of the opening 48 and the lid part 56 is sealed by the double wall portions 50 and 52 formed on the peripheral portion of the opening 48, the double wall portions 58 and 60 formed on the peripheral portion of the lid part 56, and the adhesive, sealing agent, or the like applied between the double wall portions 50 and 52 and the double wall portions 58 and 60. However, between the peripheral portion of the opening 48 and the lid part 56 may be sealed by a structure other than the above.

In the above embodiment, the opening 48 is formed in a hole shape, but the opening 48 may be formed in a notched-shape.

In the above embodiment, the plurality of magnetic induction members 68 are preferably covered with the lid part 56 from the rotor magnet 22 side, but the magnetic induction members 68 may pass through the lid part 56.

Although one embodiment of the present invention have been described above, it is needless to say that the invention is not limited to the above, and the invention can be implemented with various modifications without departing from the spirit of the invention.

The invention claimed is:

1. A brushless motor, comprising:
a stator having a plurality of teeth extending radially and a plurality of wire-wound parts wound around the respective plurality of teeth;
a rotor having a rotor magnet disposed opposing the stator at a radially outer side of the stator;
a center piece that has a plate-like portion opposing the stator at one side in an axial direction of the stator, and that holds the stator;
a control board disposed at an opposite side from the stator with respect to the plate-like portion, and provided with a plurality of magnetic detection sensors;
a first magnetic induction member, a second magnetic induction member, and a third magnetic induction member that extend from a side of the rotor magnet to a side of the respective magnetic detection sensors, and that induce magnetism generated from the rotor magnet to the respective magnetic detection sensors; and
a resin-made connector member that holds a connector terminal that is connected to the control board, and holds the first magnetic induction member, the second magnetic induction member, and the third magnetic induction member, and that is fixed to the center piece, wherein:
a relationship between a number of a plurality of magnetic poles formed in the rotor magnet and a number of a plurality of slots formed between the plurality of teeth is 10 poles and 12 slots or 14 poles and 12 slots,
the first magnetic induction member is disposed at a line bisecting an opening angle of a first slot among the plurality of slots,
the second magnetic induction member is disposed at a line bisecting an opening angle of a second slot that is positioned two slots from the first slot, among the plurality of slots, and
the third magnetic induction member is arranged so as to be shifted toward a side of the second magnetic induction member, relative to the first magnetic induction member, by an amount corresponding to 120 degrees in an electrical angle of the rotor.

2. The brushless motor according to claim 1, wherein:
the plurality of wire-wound parts include a normal winding part with a winding wire wound in a normal winding direction, and a reverse winding part with a winding wire wound in a reverse winding direction that is opposite to the normal winding direction; and
the first slot and the second slot corresponding to the first magnetic induction member and the second magnetic induction member are each configured as slots between a pair of the teeth that are adjacent to each other in a circumferential direction of the stator and that are respectively formed with the normal winding part and the reverse winding part of a same phase, among the plurality of slots.

3. The brushless motor according to claim 1, further comprising a control unit wherein:

at a start of rotation of the rotor, the control board switches a timing of energizing the plurality of wire-wound parts based on magnetism detected using the first magnetic induction member, the second magnetic induction member, and the third magnetic induction member; and at a time of normal rotation of the rotor, the control board switches a timing of energizing the plurality of wire-wound parts based on magnetism detected using at least one of the first magnetic induction member or the second magnetic induction member.

4. The brushless motor according to claim 1, further comprising a control unit wherein:

at a start of rotation of the rotor, the control board forcibly switches a timing of energizing the plurality of wire-wound parts without using the first magnetic induction member, the second magnetic induction member, or the third magnetic induction member; and at a time of normal rotation of the rotor, the control board switches a timing of energizing the plurality of wire-wound parts based on magnetism detected using at least one of the first magnetic induction member or the second magnetic induction member.

5. The brushless motor according to claim 3, wherein the control unit energizes the plurality of wire-wound parts according to a three-phase full-wave sinusoidal wave conduction method.

6. The brushless motor according to claim 1, wherein the plurality of wire-wound parts are delta-connected.

7. The brushless motor according to claim 1, wherein:

the plate-like portion is formed with an opening penetrating in a thickness direction of the plate-like portion;

the first magnetic induction member, the second magnetic induction member, and the third magnetic induction member extend from the side of the rotor magnet to the side of the respective magnetic detection sensors through the opening;

the resin-made connector member is formed with a lid part that holds the first magnetic induction member, the second magnetic induction member, and the third magnetic induction member, and that closes the opening; and a seal is provided between a peripheral portion of the opening and the lid part.

8. The brushless motor according to claim 7, wherein the first magnetic induction member, the second magnetic induction member, and the third magnetic induction member extend from the side of the rotor magnet to the side of the respective magnetic detection sensors through the opening, which is a common opening.

* * * * *